US012596217B2

(12) United States Patent
Matsushima

(10) Patent No.: US 12,596,217 B2
(45) Date of Patent: Apr. 7, 2026

(54) OPTICAL ELEMENT AND DISPLAY DEVICE

(71) Applicant: Japan Display Inc., Tokyo (JP)

(72) Inventor: Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 309 days.

(21) Appl. No.: 18/329,608

(22) Filed: Jun. 6, 2023

(65) Prior Publication Data

US 2023/0400617 A1     Dec. 14, 2023

(30) Foreign Application Priority Data

Jun. 8, 2022     (JP) ................................ 2022-092894

(51) Int. Cl.
*G02B 5/30* (2006.01)
*G02F 1/1335* (2006.01)
(52) U.S. Cl.
CPC ......... *G02B 5/3083* (2013.01); *G02B 5/3016* (2013.01); *G02F 1/133528* (2013.01)
(58) Field of Classification Search
None
See application file for complete search history.

(56) References Cited

U.S. PATENT DOCUMENTS

2018/0321431 A1* 11/2018 Kim ......................... G02B 5/30
2019/0056589 A1    2/2019 Sakai

FOREIGN PATENT DOCUMENTS

| JP | 2009-104008 A | 5/2009 | |
| JP | 2017-190017 A | 10/2017 | |
| TW | I570473 B * | 2/2017 | ............. G02B 30/27 |
| WO | 2017/175627 A1 | 10/2017 | |

OTHER PUBLICATIONS

CN-OA mailed on Nov. 21, 2025 in the corresponding Chinese patent application No. 202310660678.1, 18pp.

* cited by examiner

*Primary Examiner* — Phu Vu
(74) *Attorney, Agent, or Firm* — XSENSUS LLP

(57) ABSTRACT
An optical element includes a first polarizing plate having a first absorption axis, a second polarizing plate facing the first polarizing plate and having a second absorption axis, and a first liquid crystal film and a second liquid crystal film provided between the first polarizing plate and the second polarizing plate. The second polarizing plate, the second liquid crystal film, the first liquid crystal film, and the first polarizing plate are stacked in order, the first liquid crystal film and the second liquid crystal film each include a liquid crystal molecule immobilized in hybrid orientation along a normal direction, and a front phase difference of the first liquid crystal film and the second liquid crystal film is 200 nm or larger.

14 Claims, 21 Drawing Sheets

(TABLE 4)

| | AZIMUTH ( $\phi$ ) [deg.] | |
| --- | --- | --- |
| | EXAMPLE 4 | EXAMPLE 2-2 |
| FIRST POLARIZING PLATE 21 | 45 | 45 |
| FIRST LIQUID CRYSTAL FILM 11 (11a, 11b, 11c) | +45 | +45 |
| SECOND LIQUID CRYSTAL FILM 12 (12a, 12b, 12c) | -35 | -45 |
| SECOND POLARIZING PLATE 22 | 55 | 45 |

FIG.5

(TABLE 1)

| EXAMPLE | FRONT PHASE DIFFERENCE [nm] |
|---|---|
| COMPARATIVE EXAMPLE | 140 |
| EXAMPLE 1-1 | 207 |
| EXAMPLE 1-2 | 276 |
| EXAMPLE 1-3 | 345 |
| EXAMPLE 1-4 | 400 |
| EXAMPLE 1-5 | 483 |
| EXAMPLE 1-6 | 552 |

FIG.8

(TABLE 2)

| | COM-PARATIVE EXAMPLE | EXAMPLE 2-1 | EXAMPLE 2-2 | FRONT PHASE DIFFERENCE [nm] |
|---|---|---|---|---|
| FIRST LIQUID CRYSTAL FILM 11 | 11a | 11a | 11a | 140 |
| | | 11b | 11b | 140 |
| | | | 11c | 140 |
| SECOND LIQUID CRYSTAL FILM 12 | 12a | 12a | 12a | 140 |
| | | 12b | 12b | 140 |
| | | | 12c | 140 |

(COMPARATIVE EXAMPLE)

(EXAMPLE 2-1)

(EXAMPLE 2-2)

(GRAPH 3)

(TABLE 3)

|  | EXAMPLE 2-3 | FRONT PHASE DIFFERENCE [nm] |
|---|---|---|
| FIRST LIQUID CRYSTAL FILM 11 | 11a | 140 |
|  | 11b | 140 |
|  | 11c | 140 |
| SECOND LIQUID CRYSTAL FILM 12 | 12a | 110 |
|  | 12b | 120 |
|  | 12c | 120 |

(EXAMPLE 2-3)

(TABLE 4)

|  | AZIMUTH ($\phi$) [deg.] | |
|---|---|---|
|  | EXAMPLE 4 | EXAMPLE 2-2 |
| FIRST POLARIZING PLATE 21 | 45 | 45 |
| FIRST LIQUID CRYSTAL FILM 11 (11a, 11b, 11c) | +45 | +45 |
| SECOND LIQUID CRYSTAL FILM 12 (12a, 12b, 12c) | -35 | -45 |
| SECOND POLARIZING PLATE 22 | 55 | 45 |

(EXAMPLE 4)

OPTICAL ELEMENT AND DISPLAY DEVICE

CROSS-REFERENCE TO RELATED APPLICATION

This application claims the benefit of priority from Japanese Patent Application No. 2022-092894 filed on Jun. 8, 2022, the entire contents of which are incorporated herein by reference.

BACKGROUND

1. Technical Field

The present disclosure relates to an optical element and a display device.

2. Description of the Related Art

Widely known are display devices with an optical element that controls the viewing angle. Several viewing angle control technologies are known, including a prism structure for a backlight and a louver film in which layers that absorb light and layers that transmit light are alternately disposed.

Display devices with a viewing angle control function are required to control the viewing angle such that a display image cannot be viewed in a specific direction (refer to Japanese Patent Application Laid-open Publication No. 2009-104008 (JP-A-2009-104008), Japanese Patent Application Laid-open Publication No. 2017-190017 (JP-A-2017-190017), and PCT Publication No. WO 2017/175627). For example, JP-A-2009-104008 and PCT Publication No. WO2017/175627 disclose an optical element and a display device that can suppress reflection on a windshield and a front door glass and improve the visibility of a driver in an in-vehicle display device. The optical element disclosed in JP-A-2009-104008 has a structure in which an inclined film and a non-inclined film are sandwiched between two polarizing plates.

In the viewing angle control technologies, the prism structure has difficulty in achieving horizontally asymmetric luminance distribution and suppressing transmission of light in a specific direction. While the louver film can provide desirable light distribution, it may possibly reduce the brightness as a whole. The optical element disclosed in JP-A-2009-104008 includes different types of phase difference films (the inclined film and the non-inclined film). Therefore, an optical element that can suppress transmission of light in a specific direction with a simpler configuration is required.

SUMMARY

An optical element according to an embodiment of the present disclosure includes a first polarizing plate having a first absorption axis, a second polarizing plate facing the first polarizing plate and having a second absorption axis, and a first liquid crystal film and a second liquid crystal film provided between the first polarizing plate and the second polarizing plate. The second polarizing plate, the second liquid crystal film, the first liquid crystal film, and the first polarizing plate are stacked in order, the first liquid crystal film and the second liquid crystal film each include a liquid crystal molecule immobilized in hybrid orientation along a normal direction, and a front phase difference of the first liquid crystal film and the second liquid crystal film is 200 nm or larger.

An optical element according to an embodiment of the present disclosure includes a first polarizing plate having a first absorption axis, a second polarizing plate facing the first polarizing plate and having a second absorption axis, and a plurality of first liquid crystal films and a plurality of second liquid crystal films provided between the first polarizing plate and the second polarizing plate. The second polarizing plate, the second liquid crystal films, the first liquid crystal films, and the first polarizing plate are stacked in order, the first liquid crystal films and the second liquid crystal films each include a liquid crystal molecule immobilized in hybrid orientation along a normal direction, and a front phase difference of the first liquid crystal films and the second liquid crystal films is 110 nm or larger.

A display device according to an embodiment of the present disclosure includes the optical element above, and a display panel layered with the optical element.

BRIEF DESCRIPTION OF THE DRAWINGS

FIG. 5 is a table indicating the planar phase difference of the liquid crystal films in the display device according to Example 1 and a comparative example;

FIG. 8 is a table indicating the multilayered configuration and the planar phase difference of the liquid crystal films according to Example 2 and a comparative example;

DETAILED DESCRIPTION

Figure 1:
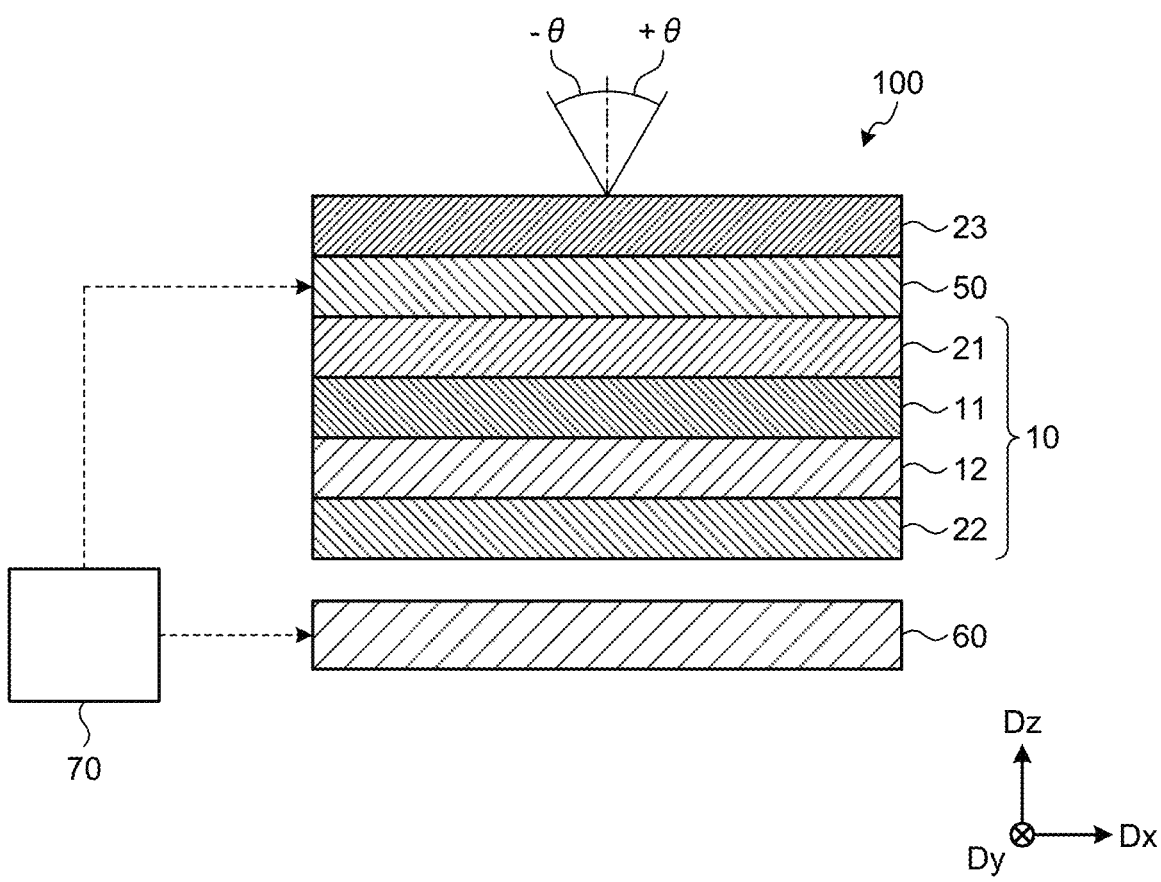
FIG. 1 is a sectional view schematically illustrating a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

When the term "on" is used to describe an aspect where a first structure is disposed on a second structure in the present specification and the claims, it includes both of the following cases unless otherwise noted: a case where the first structure is disposed directly on and in contact with the second structure, and a case where the first structure is disposed on the second structure with another structure interposed therebetween.

First Embodiment

FIG. 1 is a sectional view schematically illustrating a display device according to a first embodiment. As illustrated in FIG. 1, a display device 100 includes an optical element 10, a display panel 50, a third polarizing plate 23, a lighting device 60, and a control circuit 70.

The optical element 10 is disposed between the lighting device 60 and the display panel 50 in a direction perpendicular to the display surface of the display panel (third direction Dz). In other words, the lighting device 60, the optical element 10, the display panel 50, and the third polarizing plate 23 are stacked in order in the third direction Dz. The optical element 10 includes a first polarizing plate 21, a first liquid crystal film 11, a second liquid crystal film 12, and a second polarizing plate 22. In the optical element 10, the second polarizing plate 22, the second liquid crystal film 12, the first liquid crystal film 11, and the first polarizing plate 21 are stacked in order in the third direction Dz from the lighting device 60 toward the display panel 50. The detailed configuration of the optical element 10 will be described later with reference to FIG. 2 and the subsequent figures.

In the following description, a first direction Dx is one direction in a plane parallel to the surface of the optical element 10 (that is, the surface of the first polarizing plate 21). A second direction Dy is one direction in the plane parallel to the surface of the optical element 10 and orthogonal to the first direction Dx. The second direction Dy may intersect the first direction Dx without being orthogonal thereto. The third direction Dz is a direction orthogonal to the first direction Dx and the second direction Dy. The third direction Dz is the normal direction of the surface of the optical element 10. In other words, the third direction Dz is the normal direction of the display surface of the display panel 50. The term "plan view" refers to the positional relation when viewed from a direction perpendicular to the surface of the optical element 10.

The display panel 50 is a liquid crystal display panel including an array substrate, a counter substrate, and a liquid crystal layer serving as a display functional layer, for example. The counter substrate is disposed facing the array substrate, and the space between the array substrate and the counter substrate is sealed with the liquid crystal layer. The liquid crystal layer modulates light passing therethrough depending on the state of the electric field and is made of a liquid crystal in a lateral electric field mode, such as the in-plane switching (IPS) mode including the fringe field switching (FFS) mode. The liquid crystal layer according to the present embodiment is driven by a lateral electric field generated between a pixel electrode and a common electrode provided to the array substrate.

The present embodiment is not limited to this aspect, and the display panel 50 may be a vertical electric field liquid crystal display panel. In this case, the pixel electrode is provided to the array substrate, and the common electrode is provided to the counter substrate. Examples of the system of the vertical electric field liquid crystal display panel include, but are not limited to, twisted nematic (TN), vertical alignment (VA), electrically controlled birefringence (ECB), etc. in which what is called a vertical electric field is applied to the liquid crystal layer.

The lighting device 60 is a backlight unit. The lighting device 60 may have any configuration and may be an edge-lit backlight or a direct backlight, for example. The edge-lit backlight includes a light source, such as light emitting diodes (LEDs), and a light guide plate, and the LEDs are provided at the end of the light guide plate. In the direct backlight, the LEDs are provided directly under a diffusion plate.

The control circuit 70 is electrically coupled to the display panel 50 and the lighting device 60 and is configured to control the drive of the display panel 50 and the lighting device 60.

In the display device 100 according to the present embodiment, the lighting device 60 outputs diffused light toward the optical element 10. The optical element 10 is a viewing angle control element that adjusts the viewing angle dependence of light incident from the lighting device to suppress transmission of light in a specific direction. In other words, the light transmitted through the optical element 10 is more directional than the light output from the lighting device 60. The light transmitted through the optical element 10 is incident on the display panel 50. As a result, the display panel 50 displays an image the brightness of which is reduced in a specific direction.

In the following description, a polar angle θ is an angle formed with a direction parallel to the third direction Dz. The polar angle θ in the direction parallel to the third direction Dz is 0°. In FIG. 1, the polar angle θ on the right side (one side in the first direction Dx) with respect to the third direction Dz may be referred to as positive (+θ), and the polar angle θ on the left side (the other side in the first direction Dx) with respect to the third direction Dz may be referred to as negative (−θ).

The layers of the optical element 10, the display panel 50, and the third polarizing plate 23 are bonded by translucent adhesive layers (not illustrated). The configuration is not limited thereto, and the layers of the optical element 10, the display panel 50, and the third polarizing plate 23 may be stacked not with the adhesive layers but with air layers interposed therebetween.

The first polarizing plate 21 of the optical element according to the present embodiment also serves as a polarizing plate on the back side of the display panel 50. In other words, one first polarizing plate 21 is disposed between the display panel 50 and the first liquid crystal film 11 of the optical element 10. This configuration can improve the light transmittance compared with a configuration in which a polarizing plate for the display panel 50 is provided besides the first polarizing plate 21 of the optical element 10 on the back side of the display panel 50.

Figure 2:
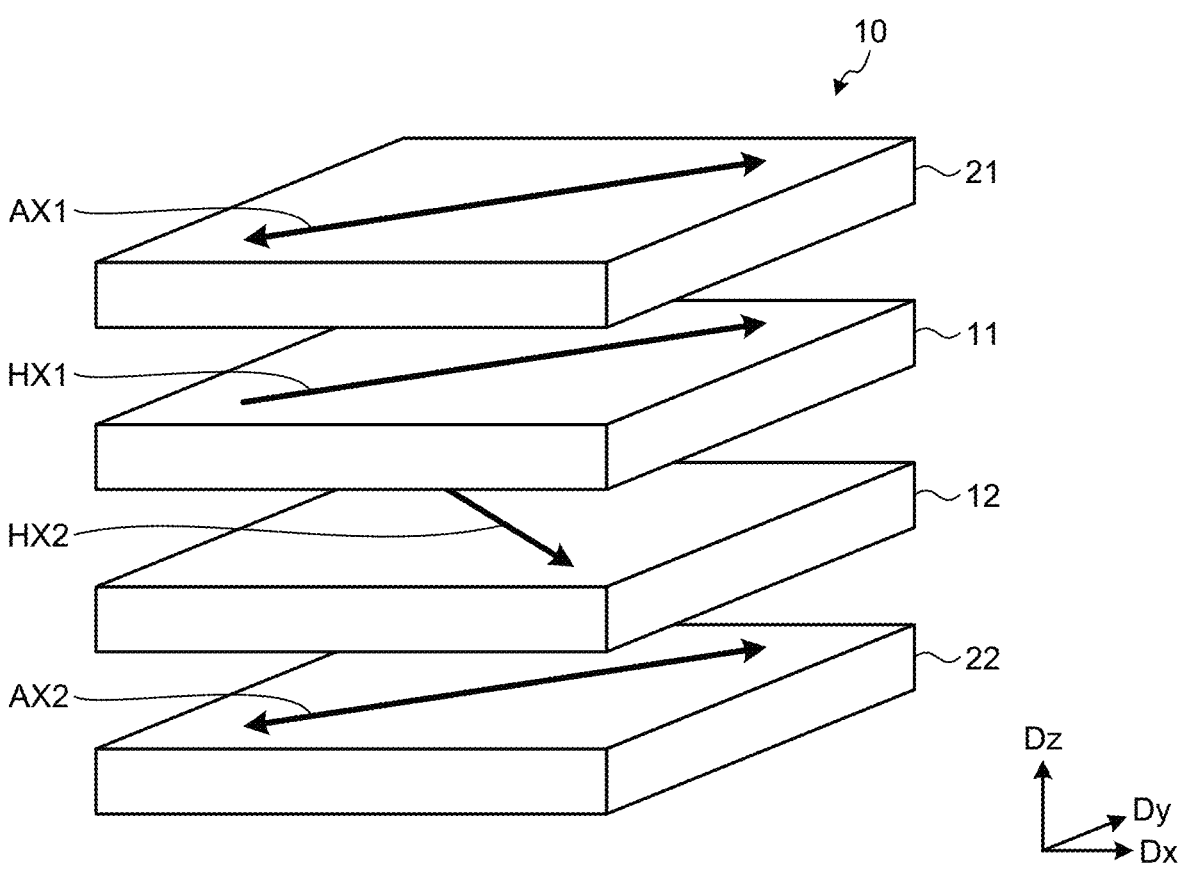
FIG. 2 is an exploded perspective view of an example of the configuration of an optical element according to the first embodiment.
Figure 3:
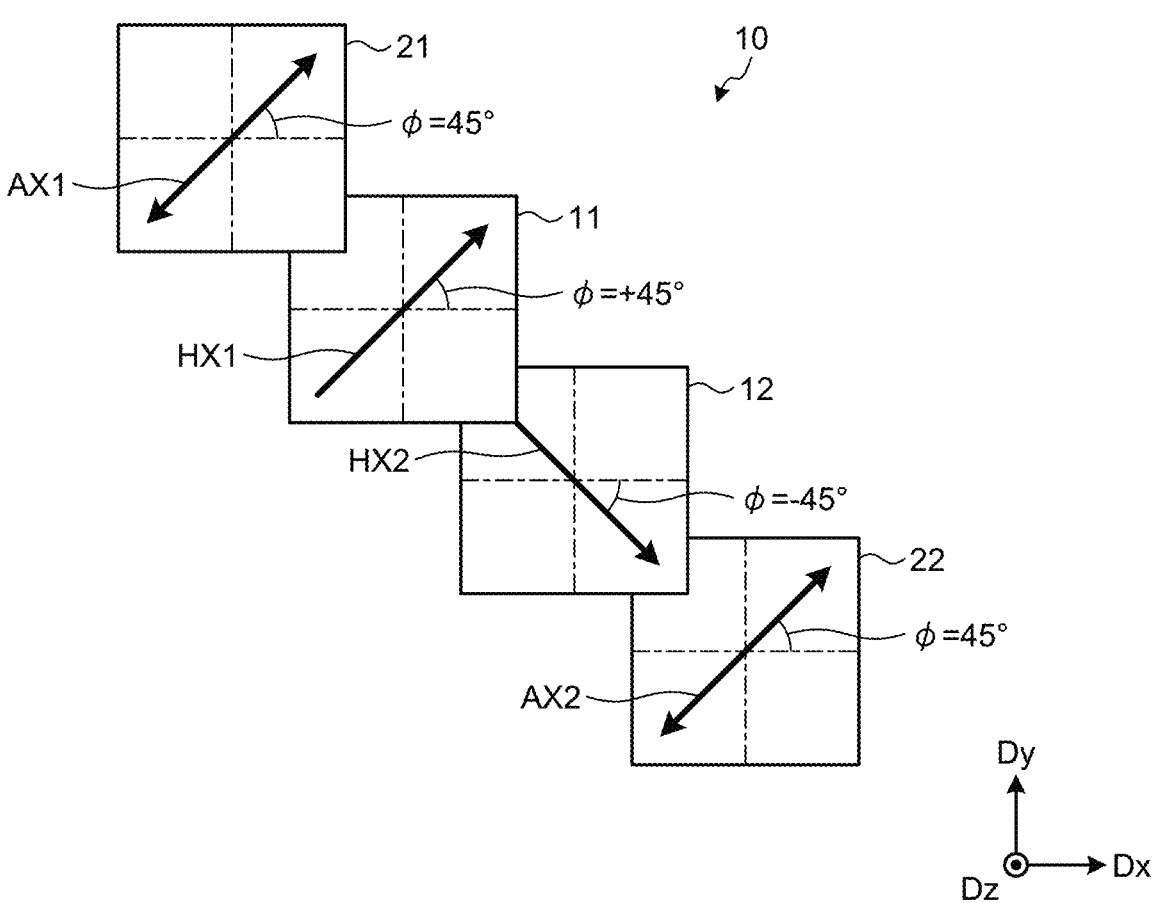
FIG. 3 is a view for explaining the relation between the azimuth of an absorption axis of each polarizing plate and the azimuth of the orientation of each liquid crystal film in the optical element according to the first embodiment.

The following describes the configuration of the optical element 10 in greater detail. FIG. 2 is an exploded perspective view of an example of the configuration of the optical element according to the first embodiment. FIG. 3 is a view for explaining the relation between the azimuth of an absorption axis of each polarizing plate and the azimuth of the orientation of each liquid crystal film in the optical element according to the first embodiment.

As illustrated in FIGS. 2 and 3, the first polarizing plate 21 and the second polarizing plate 22 are linear polarizing plates. The first polarizing plate 21 has a first absorption axis AX1 extending in the direction of an azimuth φ of 45°. The second polarizing plate 22 faces the first polarizing plate 21 and has a second absorption axis AX2 extending in the direction of an azimuth φ of 45°. The first absorption axis AX1 of the first polarizing plate 21 is parallel to the second absorption axis AX2 of the second polarizing plate 22 in plan view. The first polarizing plate 21 has a first easy axis of transmission, which is not illustrated, orthogonal to the first absorption axis AX1. The second polarizing plate 22 has a second easy axis of transmission orthogonal to the second absorption axis AX2.

The third polarizing plate 23 (refer to FIG. 1) provided on the display surface of the display panel 50 has a third absorption axis and a third easy axis of transmission orthogonal to the third absorption axis. The third absorption axis and the third easy axis of transmission of the third polarizing plate 23 are provided in a predetermined direction in plan view depending on the display mode of the display panel 50.

The azimuth φ is an angle formed with the direction parallel to the first direction Dx. The azimuth φ of a first side (right side in FIG. 3) in the first direction Dx is 0°. The azimuth φ of a second side (left side in FIG. 3) in the first direction Dx is 180°. The azimuth φ of a first side (upper side in FIG. 3) in the second direction Dy is 90°. The azimuth φ of a second side (lower side in FIG. 3) in the second direction Dy is 270°. The azimuth φ counterclockwise with respect to the first side in the first direction Dx may be referred to as positive (+φ), and the azimuth φ clockwise with respect to the first side in the first direction Dx may be referred as negative (−φ).

The first liquid crystal film 11 and the second liquid crystal film 12 are provided between the first polarizing plate 21 and the second polarizing plate 22. The first liquid crystal film 11 is disposed on the side facing the first polarizing plate 21, and the second liquid crystal film 12 is disposed on the side facing the second polarizing plate 22.

Figure 4:
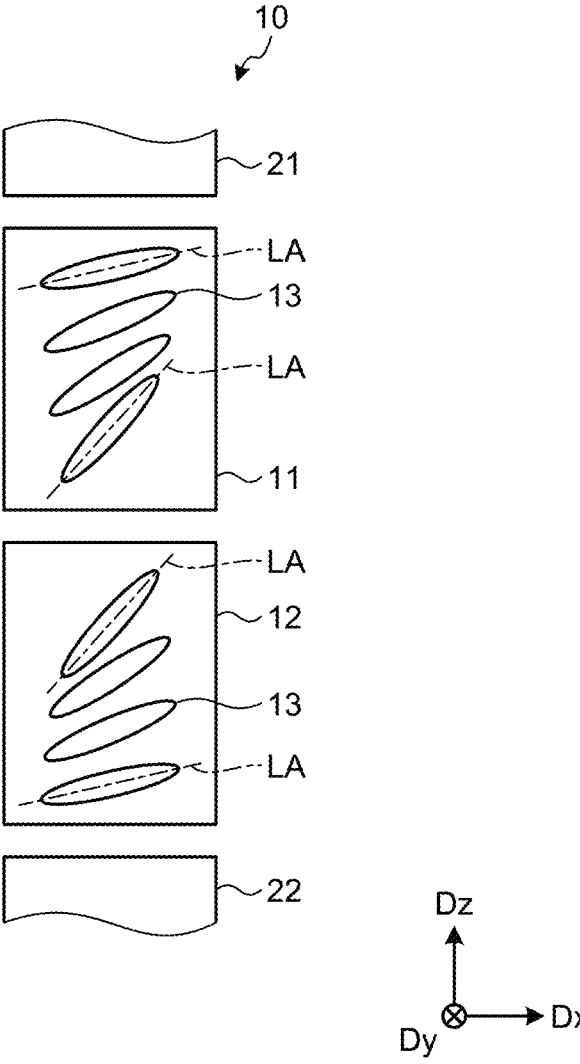
FIG. 4 is a view for explaining the orientation of liquid crystal molecules in a first liquid crystal film and a second liquid crystal film.

FIG. 4 is a view for explaining the orientation of liquid crystal molecules in the first liquid crystal film and the second liquid crystal film. As illustrated in FIG. 4, the first liquid crystal film 11 and the second liquid crystal film 12 each include rod-shaped liquid crystal molecules 13. To facilitate the reader's understanding, FIG. 4 illustrates a case where the liquid crystal molecules 13 are oriented in the same direction (first direction Dx) in plan view. The orientation directions of the liquid crystal molecules 13 in the first liquid crystal film 11 and the second liquid crystal film 12 are different in plan view, which will be described later.

The liquid crystal molecule 13 has refractive index anisotropy, and a refractive index ny (=ne) of the liquid crystal molecule 13 in a direction along a long axis LA is different from refractive indexes nx and nz (nx=nz (=no)) in a direction orthogonal to the long axis LA. The refractive index of the liquid crystal molecule 13 according to the present embodiment satisfies ny (=ne)>nx=nz (=no). The refractive index no is the refractive index of an ordinary ray passing through the first liquid crystal film 11 and the second liquid crystal film 12, and the refractive index ne is the refractive index of an extraordinary ray passing through the first liquid crystal film 11 and the second liquid crystal film 12.

In the first liquid crystal film 11 and the second liquid crystal film 12, the liquid crystal molecules 13 are immobilized in hybrid orientation along the third direction Dz. The hybrid orientation refers to a state where the liquid crystal molecules 13 with the long axis LA sandwiched between a pair of substrates are oriented such that the direction of the long axis LA is parallel to a first substrate on the side facing the first substrate and perpendicular to a second substrate on the side facing the second substrate. As illustrated in FIG. 4, in the first liquid crystal film 11 and the second liquid crystal film 12, the inclination angle of the long axis LA of the liquid crystal molecules 13 with respect to the direction parallel to the surfaces of the first liquid crystal film 11 and the second liquid crystal film 12 (e.g., the first direction Dx) continuously varies along the third direction Dz.

The liquid crystal molecules 13 of the first liquid crystal film 11 have a relatively small inclination angle on the side facing the first polarizing plate 21 and are oriented to be substantially parallel to the direction parallel to the surface of the first liquid crystal film 11. By contrast, the liquid crystal molecules 13 of the first liquid crystal film 11 have a relatively large inclination angle on the side facing the second liquid crystal film 12 and are oriented to be substantially perpendicular to the direction parallel to the surface of the first liquid crystal film 11. Thus, the inclination angle of the liquid crystal molecules 13 of the first liquid crystal film 11 with respect to a plane parallel to the surface of the first liquid crystal film 11 is smaller on the side facing the first polarizing plate 21 than on the side facing the second liquid crystal film 12.

The inclination angle of the liquid crystal molecules 13 of the second liquid crystal film 12 is oriented to be line-symmetric with the inclination angle of the liquid crystal molecules 13 of the first liquid crystal film 11 with respect to the direction parallel to the surface of the first liquid crystal film 11 serving as a reference axis. In other words, the liquid crystal molecules 13 of the second liquid crystal film 12 have a relatively small inclination angle on the side facing the second polarizing plate 22 and are oriented to be substantially parallel to the direction parallel to the surface of the second liquid crystal film 12. By contrast, the liquid crystal molecules 13 of the second liquid crystal film 12 have a relatively large inclination angle on the side facing the first liquid crystal film 11 and are oriented to be substantially perpendicular to the direction parallel to the surface of the second liquid crystal film 12. The inclination angle of the liquid crystal molecules 13 of the second liquid crystal film 12 with respect to a plane parallel to the surface of the second liquid crystal film 12 is smaller on the side facing the second polarizing plate 22 than on the side facing the first liquid crystal film 11.

As described above, the first liquid crystal film 11 and second liquid crystal film 12 each include the liquid crystal molecules 13 in hybrid orientation, thereby having the viewing angle dependence of the brightness. Specifically, the first liquid crystal film 11 and the second liquid crystal film 12 have the viewing angle dependence of the brightness line-symmetric with respect to the direction parallel to the orientation direction of the liquid crystal molecules 13 in plan view serving as a reference line. The first liquid crystal film 11 and the second liquid crystal film 12 have the viewing angle dependence of the brightness asymmetric with respect to the direction perpendicular to the orientation direction of the liquid crystal molecules 13 in plan view serving as a reference line.

Referring back to FIGS. 2 and 3, a first orientation direction HX1 of the first liquid crystal film 11 is parallel to the first absorption axis AX1 of the first polarizing plate 21 in plan view. A second orientation direction HX2 of the second liquid crystal film 12 is orthogonal to the first orientation direction HX1 of the first liquid crystal film 11 and to the second absorption axis AX2 of the second polarizing plate 22 in plan view. The first orientation direction HX1 is a direction along the long axis LA of the liquid crystal molecules 13 of the first liquid crystal film 11 in plan view. The second orientation direction HX2 is a direction along the long axis LA of the liquid crystal molecules 13 of the second liquid crystal film 12 in plan view.

Specifically, the azimuth φ of the first orientation direction HX1 of the first liquid crystal film 11 satisfies φ=+45°. The orientation angle φ of the second orientation direction HX2 of the second liquid crystal film 12 satisfies φ=−45°. The first orientation direction HX1 of the first liquid crystal film 11 is orthogonal to the second orientation direction HX2 of the second liquid crystal film 12 in plan view. The first orientation direction HX1 of the first liquid crystal film 11 is parallel to the first absorption axis AX1 of the first polarizing plate 21 and the second absorption axis AX2 of the second polarizing plate 22 in plan view. The second orientation direction HX2 of the second liquid crystal film 12 is orthogonal to the first absorption axis AX1 of the first polarizing plate 21 and the second absorption axis AX2 of the second polarizing plate 22 in plan view.

With the configuration described above, the optical element 10 can achieve the viewing angle dependence of the brightness asymmetric with respect to a predetermined reference axis. The predetermined reference axis is a direction parallel to the second direction Dy, for example. In this case, the optical element 10 has the polar angle dependence of the brightness asymmetric between the right side (polar angle +θ side) and the left side (polar angle −θ side) with respect to the predetermined reference axis (second direction Dy). While the above describes the configuration in which the first orientation direction HX1 of the first liquid crystal film 11 is parallel to the first absorption axis AX1 of the first polarizing plate 21, and the second orientation direction HX2 of the second liquid crystal film 12 is orthogonal to the second absorption axis AX2 of the second polarizing plate 22 in plan view, the present embodiment is not limited thereto. The first orientation direction HX1 of the first liquid crystal film 11 may be orthogonal to the first absorption axis AX1 of the first polarizing plate 21, and the second orientation direction HX2 of the second liquid crystal film 12 may be parallel to the second absorption axis AX2 of the second polarizing plate 22 in plan view.

Example 1

Figure 6:
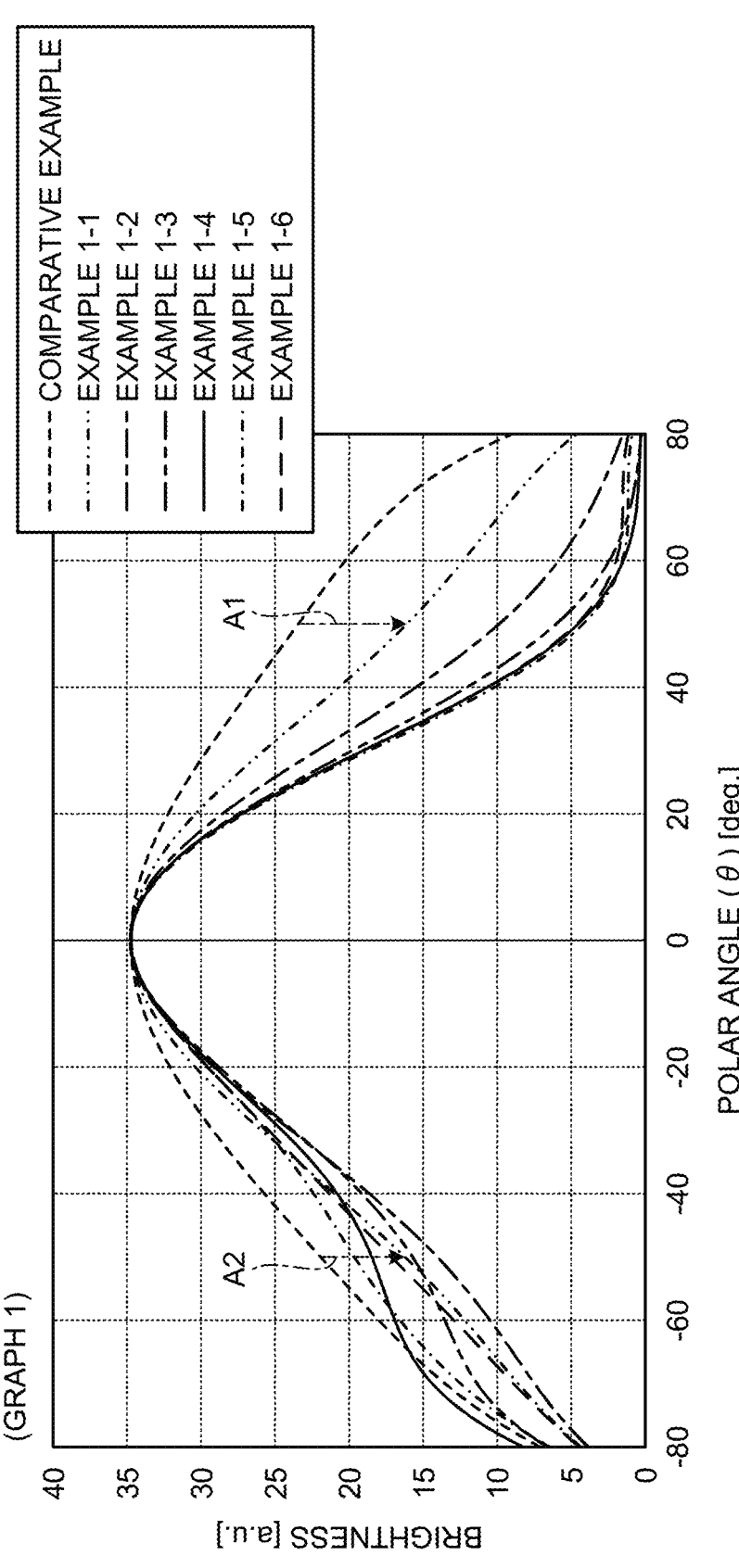
FIG. 6 is a graph indicating the relation between brightness and polar angle of the display device according to Example 1 and the comparative example.

FIG. 5 is a table indicating the planar phase difference of the liquid crystal films in the display device according to Example 1 and a comparative example. FIG. 6 is a graph indicating the relation between brightness and polar angle of the display device according to Example 1 and the comparative example.

The multilayered configuration of the optical element according to Examples 1-1 to 1-6 and the comparative example illustrated in FIGS. 5 and 6 are the same as that according to the example illustrated in FIGS. 1 to 4. As illustrated in FIG. 5, the optical elements 10 according to Examples 1-1 to 1-6 and the comparative example have different front phase difference values of the liquid crystal films (the first liquid crystal film 11 and the second liquid crystal film 12). In the examples and the comparative example, the front phase difference of the first liquid crystal film 11 and that of the second liquid crystal film 12 are equivalent values.

The front phase difference of the first liquid crystal film 11 and the second liquid crystal film 12 is defined by the front phase difference Re=(nx−ny)×d, where nx and ny are the refractive indexes corresponding to the orthogonal axes in each plane, and d is the thickness. The in-plane refractive index ny of the first liquid crystal film 11 and the second liquid crystal film 12 is the refractive index corresponding to the first orientation direction HX1 and the second orientation direction HX2, respectively. The in-plane refractive index nx is the refractive index corresponding to the direction orthogonal to the first orientation direction HX1 and the second orientation direction HX2.

As illustrated in FIG. 5, the front phase differences of the first liquid crystal film and the second liquid crystal film of the optical element according to the comparative example are 140 nm. The front phase differences of the first liquid crystal film 11 and the second liquid crystal film 12 of the optical element 10 according to Examples 1-1, 1-2, 1-3, 1-4, 1-5, and 1-6 are 207 nm, 276 nm, 345 nm, 400 nm, 483 nm, and 552 nm, respectively.

In Graph 1 illustrated in FIG. 6, the horizontal axis indicates polar angle θ (°), and the vertical axis indicates brightness (a.u.). FIG. 6 illustrates the simulation results of relative polar angle dependence of the brightness when the brightness in the front direction (polar angle θ=0°) is equivalent in the examples and the comparative example.

As illustrated in FIG. 6, the display device according to the comparative example (front phase difference of 140 nm) exhibits the polar angle dependence of the brightness substantially symmetric with respect to a polar angle θ of °. By contrast, the display device according to Example 1-1 (front phase difference of 207 nm) exhibited asymmetric polar angle dependence of the brightness. Specifically, Example 1-1 reduces the brightness on the positive polar angle θ side compared with the comparative example. As indicated by arrows A1 and A2, for example, the difference in brightness between Example 1-1 and the comparative example on the positive polar angle θ side (e.g., polar angle θ=50)° (arrow A1) is larger than the difference in brightness between Example 1-1 and the comparative example on the negative polar angle θ side (e.g., polar angle θ=−°) (arrow A2).

By setting the front phase difference of the first liquid crystal film 11 and the second liquid crystal film 12 of the optical element 10 to 276 nm or larger, the brightness is reduced on the positive polar angle θ side compared with the negative polar angle θ side as illustrated in Examples 1-2 to 1-6. In the display device according to Example 1-2 (front phase difference of 276 nm), the brightness on the positive polar angle θ side (e.g., polar angle θ=50°) is darker than that on the negative polar angle θ side (e.g., polar angle θ=−50°).

In the display device according to Example 1-3 (front phase difference of 345 nm), the brightness on the negative polar angle θ side (e.g., polar angle θ=−50°) is equivalent to that of Example 1-2, but the brightness on the positive polar angle θ side (e.g., polar angle θ=50°) is further reduced. In Examples 1-4, 1-5, and 1-6 (front phase differences of 400 nm, 483 nm, and 552 nm), the brightness on the positive polar angle θ side (e.g., polar angle θ=50°) is reduced compared with that of Example 1-3. The polar angle dependence of the brightness on the positive polar angle θ side in Examples 1-4, 1-5, and 1-6, however, exhibits a similar tendency.

As described above, it is found out that the display device 100 with the optical element 10 can reduce the brightness in a specific direction (e.g., polar angle θ=) ° within the range of front phase differences of the first liquid crystal film 11 and the second liquid crystal film 12 of 200 nm to 552 nm. More preferably, the display device 100 can reduce the brightness at a polar angle θ of 50° within the range of front phase differences of the first liquid crystal film 11 and the second liquid crystal film 12 of 270 nm to 552 nm. In other words, the optical element 10 can reduce the light transmittance in a specific direction (e.g., polar angle θ=50°).

When the display device 100 having such polar angle dependence of the brightness is used for an in-vehicle display device, it can suppress reflection on the window glass on the passenger side (e.g., polar angle θ=50°) while securing the brightness on the driver side (e.g., polar angle θ=−50°) and the passenger side (e.g., polar angle θ=0°).

Second Embodiment

Figure 7:
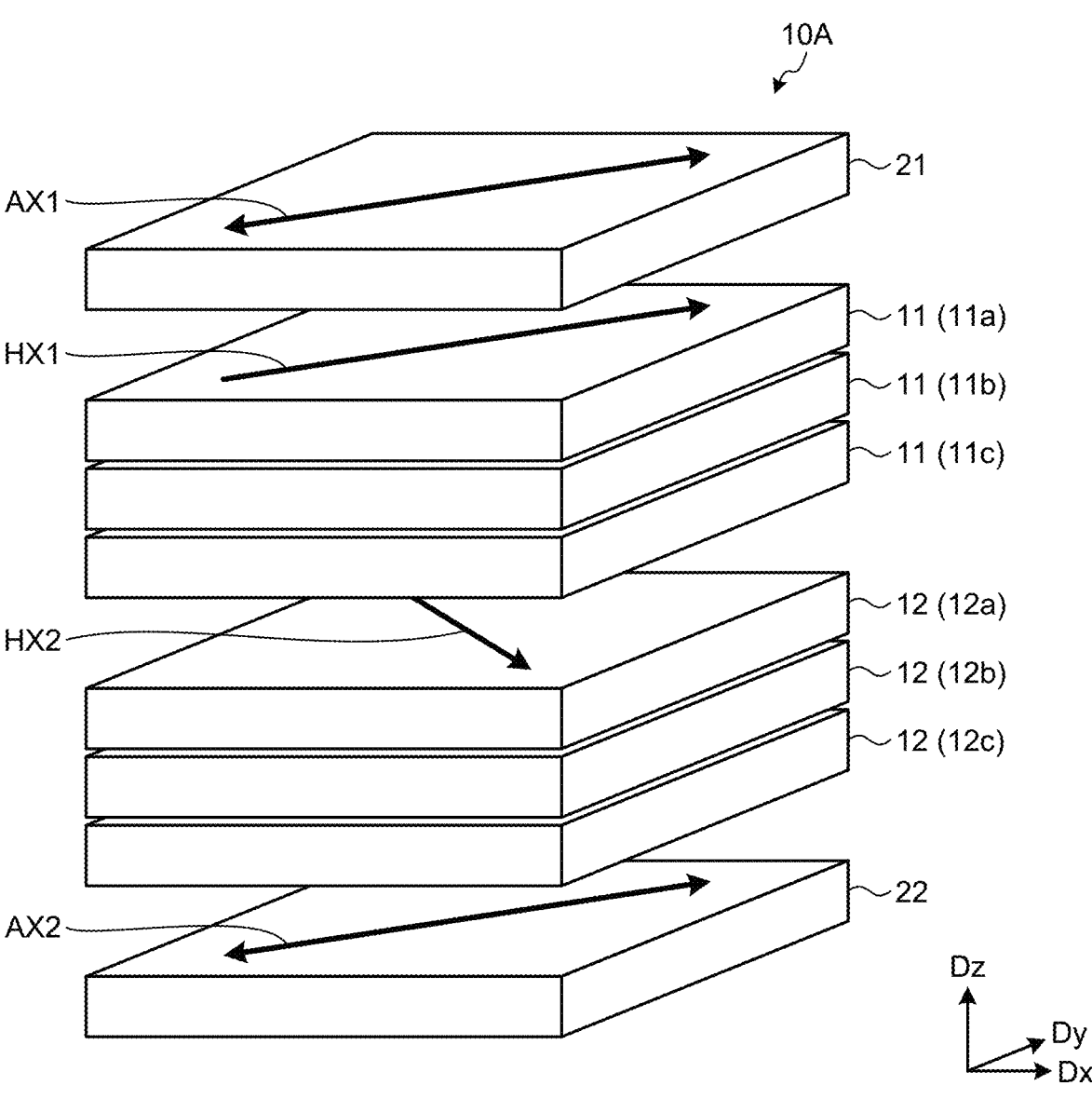
FIG. 7 is an exploded perspective view of an example of the configuration of the optical element according to a second embodiment.

FIG. 7 is an exploded perspective view of an example of the configuration of the optical element according to the second embodiment. In the following description, the same components as those described in the embodiment above are denoted by like reference numerals, and overlapping explanation is omitted.

As illustrated in FIG. 7, an optical element 10A according to the second embodiment includes a plurality of first liquid crystal films 11a, 11b, and 11c and a plurality of second liquid crystal films 12a, 12b, and 12c. The first orientation directions HX1 of the first liquid crystal films 11a, 11b, and 11c are parallel in plan view, and the azimuth φ of them satisfies φ=+45°. The second orientation directions HX2 of the second liquid crystal films 12a, 12b, and 12c are parallel in plan view, and the azimuth φ of them satisfies φ=−45°. The planar phase differences of the first liquid crystal films 11a, 11b, and 11c and the second liquid crystal films 12a, 12b, and 12c are equivalent values (e.g., 140 nm or larger).

The relation of the azimuths φ of the first absorption axis AX1 of the first polarizing plate 21, the first orientation direction HX1 of the first liquid crystal films 11a, 11b, and 11c, the second orientation direction HX2 of the second liquid crystal films 12a, 12b, and 12c, and the second absorption axis AX2 of the second polarizing plate 22 in plan view is the same as that according to the first embodiment described above (refer to FIG. 3), and repetitive explanation is omitted.

In the example illustrated in FIG. 7, the optical element 10A includes three layers of the first liquid crystal films 11a, 11b, and 11c and three layers of the second liquid crystal films 12a, 12b, and 12c. This configuration is given by way of example only and can be appropriately modified. The first liquid crystal film 11 and the second liquid crystal film 12 may each be composed of two layers or four or more layers.

Example 2

FIG. 8 is a table indicating the multilayered configuration and the planar phase difference of the liquid crystal films according to Example 2 and a comparative example. As illustrated in FIG. 8, the optical element according to the comparative example includes one layer of the first liquid crystal film 11a and one layer of the second liquid crystal film 12a, and the front phase differences of them are 140 nm. The comparative example illustrated in FIG. 8 has the configuration and the polar angle dependence of the brightness equivalent to those of the comparative example in Example 1 described above.

The optical element according to Example 2-1 includes two layers of the first liquid crystal films 11a and 11b and two layers of the second liquid crystal films 12a and 12b and is composed of a total of four layers of the liquid crystal films. In Example 2-1, the front phase differences of the first liquid crystal films 11a and 11b and the second liquid crystal films 12a and 12b are 140 nm.

The optical element according to Example 2-2 includes three layers of the first liquid crystal films 11a, 11b, and 11c and three layers of the second liquid crystal films 12a, 12b, and 12c and is composed of a total of six layers of the liquid crystal films. In Example 2-2, the front phase differences of the first liquid crystal films 11a, 11b, and 11c and the second liquid crystal films 12a, 12b, and 12c are 140 nm.

Figure 9:
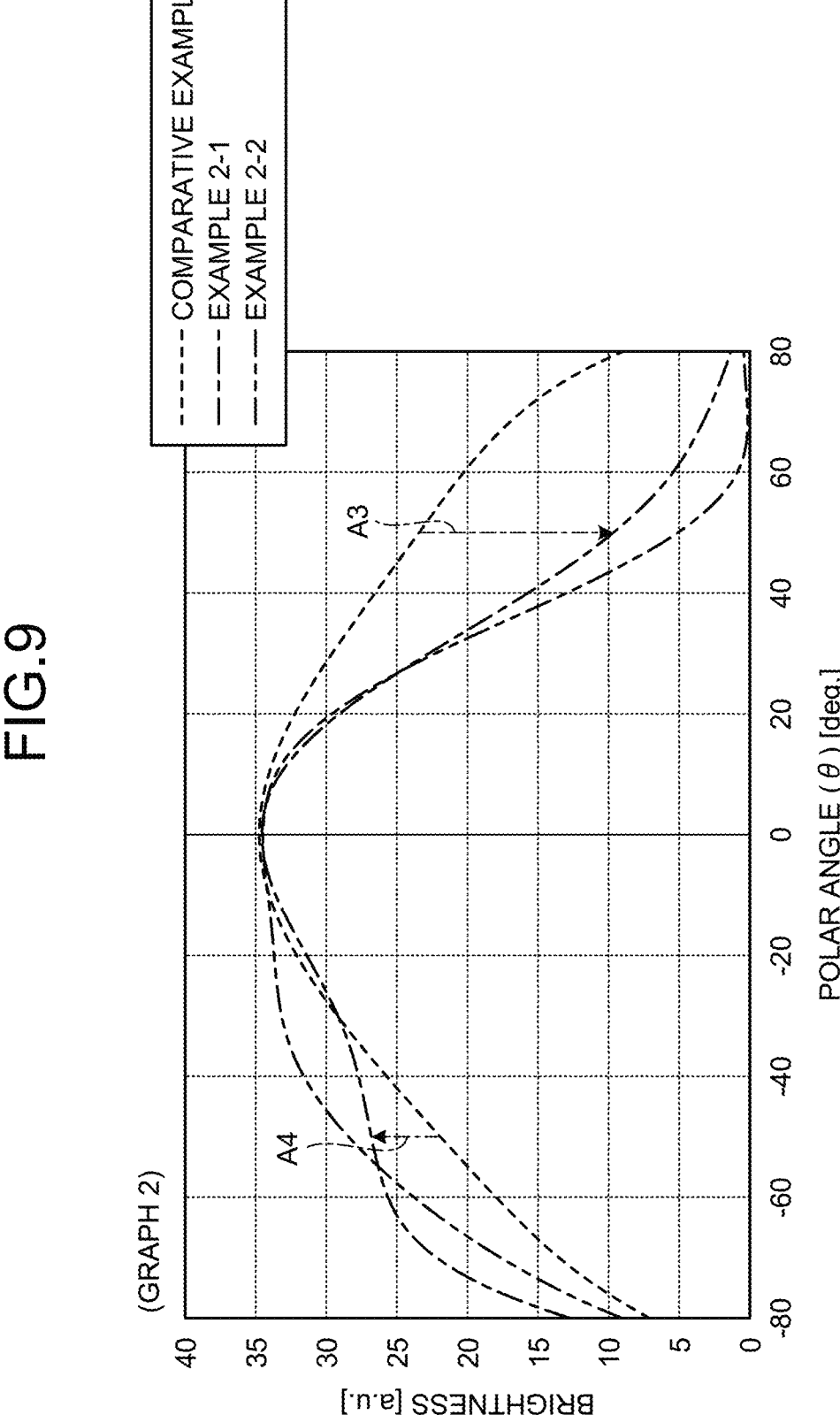
FIG. 9 is a graph indicating the relation between brightness and polar angle of the optical element according to Example 2 and the comparative example.
Figure 10:
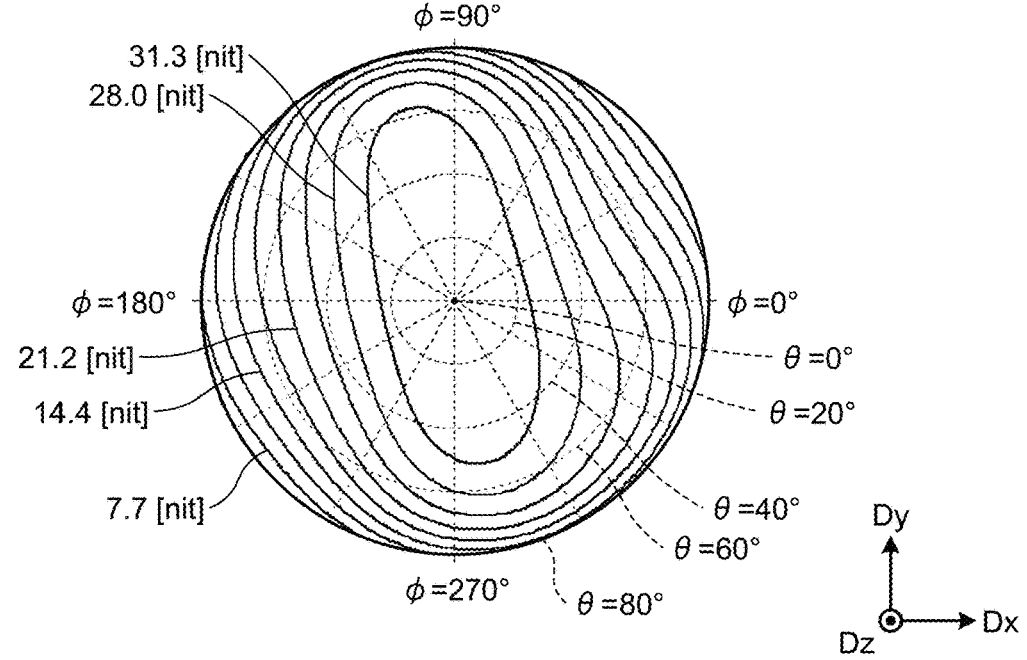
FIG. 10 is a diagram of the viewing angle dependence of the brightness of the display device according to the comparative example.
Figure 11:
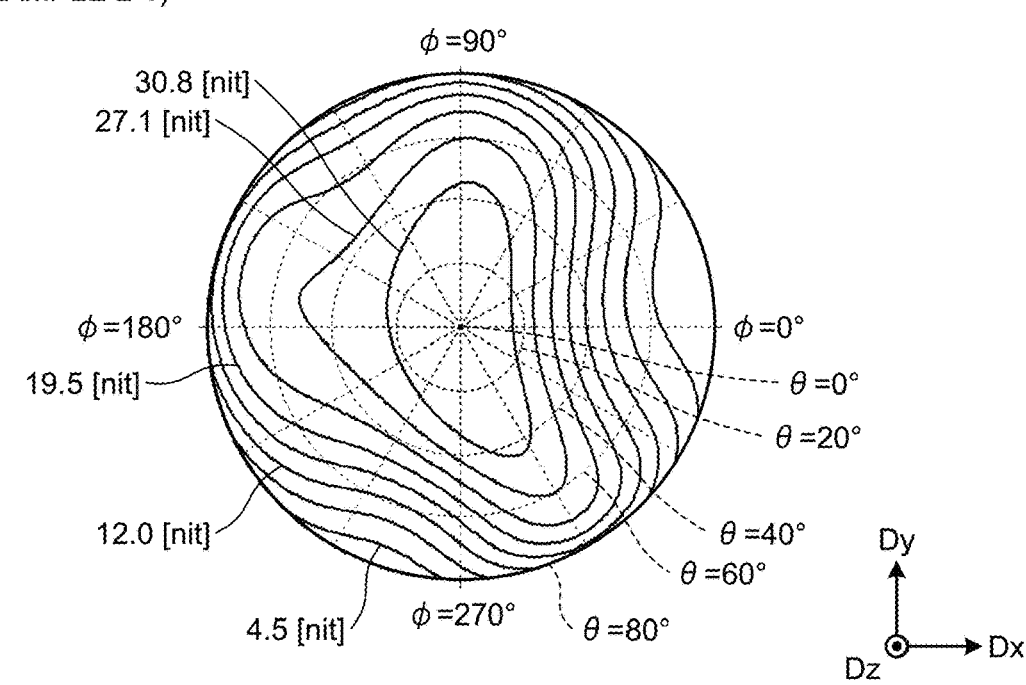
FIG. 11 is a diagram of the viewing angle dependence of the brightness of the display device according to Example 2-1.

FIG. 9 is a graph indicating the relation between brightness and polar angle of the optical element according to Example 2 and the comparative example. FIG. 10 is a diagram of the viewing angle dependence of the brightness of the display device according to the comparative example. FIG. 11 is a diagram of the viewing angle dependence of the brightness of the display device according to Example 2-1.

Figure 12:
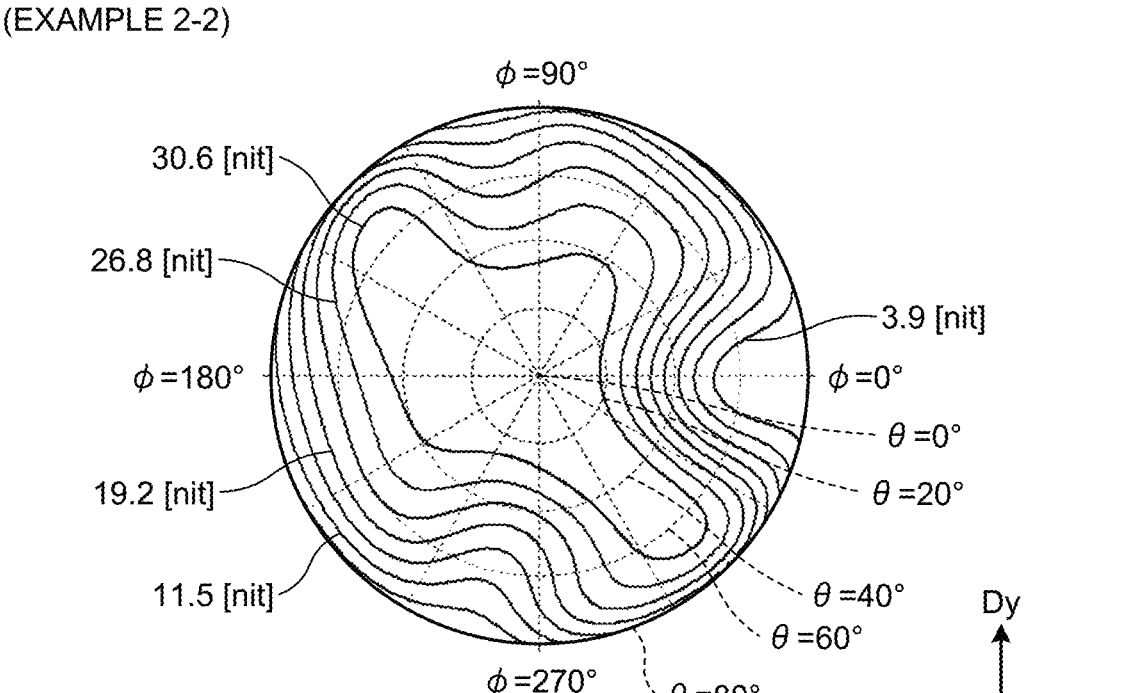
FIG. 12 is a diagram of the viewing angle dependence of the brightness of the display device according to Example 2-2.

FIG. 12 is a diagram of the viewing angle dependence of the brightness of the display device according to Example 2-2.

FIGS. 10 to 12 illustrate isophote obtained by connecting regions having equal brightness at each polar angle and each azimuth. In FIGS. 10 to 12, the azimuth φ is an angle formed with the direction parallel to the first direction Dx. In FIGS. 10 to 12, the azimuth φ of the right side with respect to the center of the circle is 0°, and the azimuth φ of the left side with respect to the center of the circle is 180°. The azimuth φ of the upper side with respect to the center of the circle is 90°, and the azimuth φ of the lower side with respect to the center of the circle is 270°. The center of the circle corresponds to the normal direction (polar angle θ=0°) of the display device 100 (optical element 10A), and concentric circles (represented by dotted lines) centered on the normal direction correspond to polar angles θ of 20°, 40°, 60° and 80°.

In the explanation of the viewing angle dependence of the brightness, the direction of an azimuth φ of 0° and the direction of an azimuth φ of 180° with respect to a polar angle θ of 0° may be referred to as a left-right direction. The direction of an azimuth φ of 90° and the direction of an azimuth of 270° with respect to a polar angle θ of 0° may be referred to as an up-down direction.

As illustrated in FIG. 9, in the display device according to the comparative example including one layer of the first liquid crystal film 11 and one layer of the second liquid crystal film 12, the polar angle dependence of the brightness is symmetric with respect to a polar angle θ of 0°. As illustrated in FIG. 10, the display device according to the comparative example has the viewing angle dependence of the brightness substantially horizontally symmetric with respect to a reference line passing through a polar angle θ of 0° and parallel to the second direction Dy. The display device according to the comparative example has the viewing angle dependence of the brightness substantially vertically symmetric with respect to a reference line passing through a polar angle θ of 0° and parallel to the first direction Dx.

As illustrated in FIGS. 9, 11, and 12, it is found out that the display device according to Examples 2-1 and 2-2 including a plurality of first liquid crystal films 11 and a plurality of second liquid crystal films 12 has asymmetric polar angle dependence of the brightness and reduces the brightness on the positive polar angle θ side (azimuth φ=0°) compared with the comparative example.

Specifically, in Example 2-1, the brightness on the positive polar angle θ side (e.g., polar angle θ=50°) is reduced (darkened) compared with the comparative example as indicated by arrow A3 illustrated in FIG. 9. In Example 2-1, the brightness on the negative polar angle θ side (e.g., polar angle θ=−50°) is higher than that of the comparative example as indicated by arrow A4.

As illustrated in FIG. 9, in Example 2-2, the brightness on the positive polar angle θ side (e.g., polar angle θ=50°) is reduced (darkened) compared with the comparative example and Example 2-1. The brightness on the negative polar angle θ side (e.g., polar angle θ=−50°) is higher than that of the comparative example. Example 2-1 and Example 2-2 have tendency to have different polar angle dependences of the brightness on the negative polar angle θ side. More specifically, Example 2-2 is brighter than Example 2-1 within the range of the front side (polar angle θ=approximately −55° to −10°), and Example 2-1 is brighter than Example 2-2 on the high polar angle side (polar angle θ=−55° or smaller).

As illustrated in FIG. 11, the display device according to Example 2-1 reduces the brightness on the right side (azimuth φ=0°) and improves the brightness on the left side (azimuth φ=180°) with respect to the reference line passing through a polar angle θ of 0° and parallel to the second direction Dy. In other words, in the display device according to Example 2-1, the viewing angle dependence of the brightness is asymmetric in the left-right direction. The display device according to Example 2-1 has the viewing angle dependence of the brightness substantially vertically symmetric with respect to the reference line passing through a polar angle θ of 0° and parallel to the first direction Dx.

As illustrated in FIG. 12, the display device according to Example 2-2 reduces the brightness on the right side (azimuth φ=0° side) and improves the brightness on the left side (azimuth φ=180° side) with respect to the reference line passing through a polar angle θ of 0° and parallel to the second direction Dy. In other words, in the display device according to Example 2-2, the viewing angle dependence of the brightness is asymmetric in the left-right direction. In the display device according to Example 2-2, the viewing angle range indicating relatively bright regions is larger, and the range of the azimuth of regions where the brightness is reduced (darkened) on the azimuth φ=0° side is smaller than those of Example 2-1 illustrated in FIG. 11. In other words, the display device according to Example 2-2 can reduce the brightness in a specific viewing angle region and improve the brightness in the other regions compared with the comparative example and Example 2-1. In the display device according to Example 2-2, the region where the viewing angle dependence of the brightness is vertically asymmetric with respect to the reference line passing through a polar angle θ of 0° and parallel to the first direction Dx is larger than that of Example 2-1.

As described above, it is found out that the display device 100 with the optical element 10A can reduce the brightness in a specific direction (e.g., polar angle θ=50°) by stacking a plurality of first liquid crystal films 11 and a plurality of second liquid crystal films 12. More preferably, the display device 100 can reduce the brightness at polar angles θ of 50° or larger within the range of front phase differences of the first liquid crystal films 11 and the second liquid crystal films 12 of 140 nm or larger. In addition, the present example can reduce the brightness in a specific direction (e.g., polar angle θ=50°) and improve the brightness in the opposite direction (e.g., polar angle θ=−50°) compared with the first embodiment and Example 1 described above.

When the display device 100 having such polar angle dependence of the brightness is used for an in-vehicle display device, it can improve the brightness on the driver side (negative polar angle θ side, e.g., polar angle θ=+50°) and suppress reflection on the window glass on the passenger side (positive polar angle θ side, e.g., polar angle θ=−50°).

Figure 13:
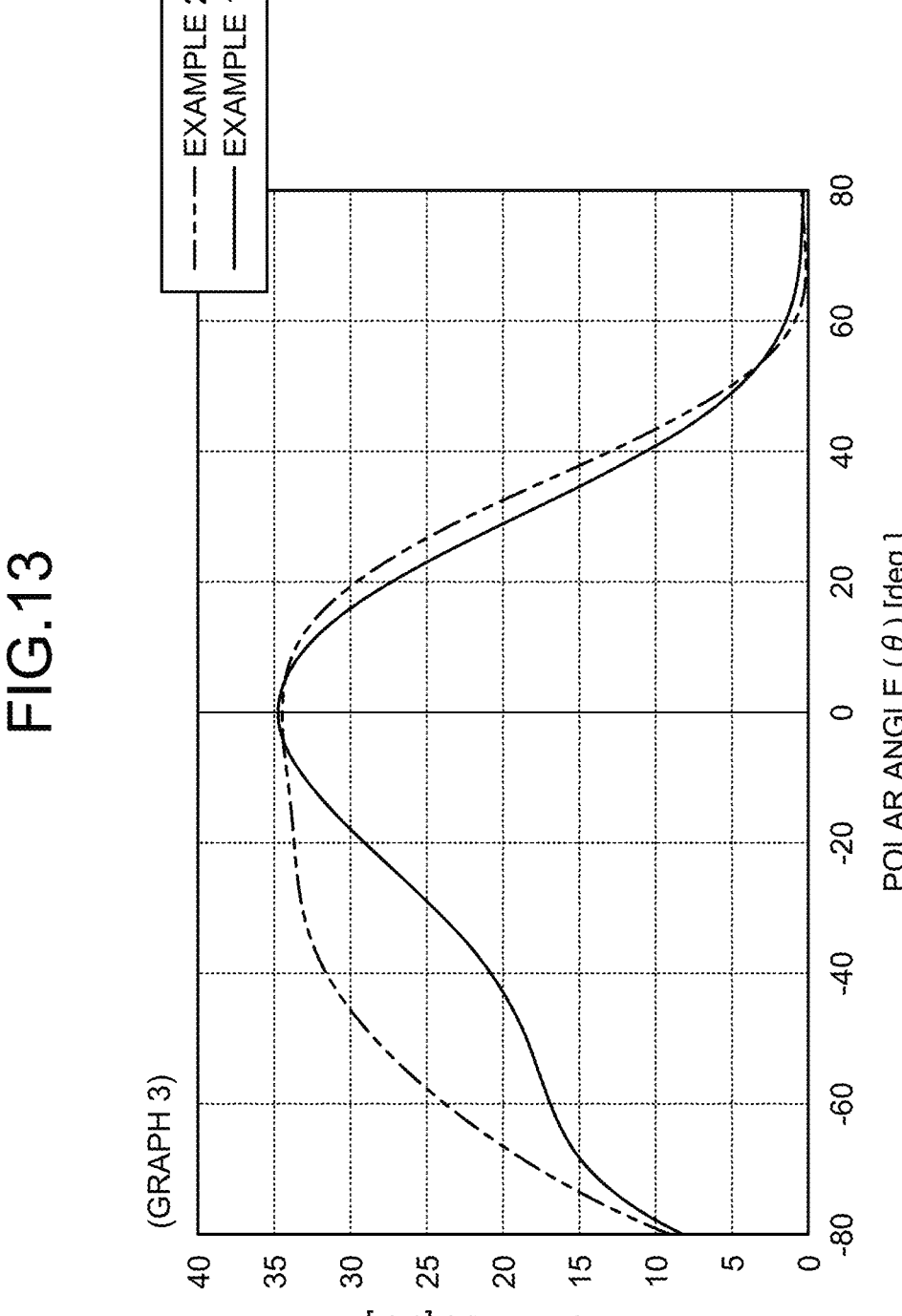
FIG. 13 is a graph indicating the relation between brightness and polar angle of the optical element according to Example 2-2 and Example 1-4.

FIG. 13 is a graph indicating the relation between brightness and polar angle of the optical element according to Example 2-2 and Example 1-4. As described above with reference to FIG. 8, the optical element according to Example 2-2 includes three layers of the first liquid crystal films 11a, 11b, and 11c and three layers of the second liquid crystal films 12a, 12b, and 12c, and the front phase differences of them are 140 nm. As described above with reference to FIG. 5, the optical element according to Example 1-4 includes one layer of the first liquid crystal film 11 and one layer of the second liquid crystal film 12, and the front phase differences of them are 400 nm.

The total front phase difference of three layers of the first liquid crystal films 11a, 11b, and 11c in Example 2-2 is 420 nm, which is close to a front phase difference of 400 nm of one layer of the first liquid crystal film 11 in Example 1-4. The total front phase difference of three layers of the second liquid crystal films 12*a*, 12*b*, and 12*c* in Example 2-2 is 420 nm, which is close to a front phase difference of 400 nm of one layer of the second liquid crystal film 12 in Example 1-4. In other words, FIG. 13 is a graph for comparing Example 2-2 where a pair of three-layer liquid crystal films is stacked to form a total of six layers with Example 1-4 where a pair of one-layer liquid crystal film is stacked to form a total of two layers when the values of the total front phase difference are as close as possible.

As illustrated in FIG. 13, the polar angle dependence of the brightness in Example 2-2 is substantially equivalent to that in Example 1-4 on the positive polar angle θ side (polar angle θ=50° or larger). By contrast, Example 2-2 is brighter than Example 1-4 on the negative polar angle θ side. Example 2-2 is brighter than Example 1-4 within the range of polar angles θ of approximately −70° to −10°.

Thus, both Example 2-2 and Example 1-4 can reduce the brightness in a specific direction (polar angle θ=50° or larger). In addition, Example 2-2 provided with a plurality of first liquid crystal films 11*a*, 11*b*, and 11*c* and a plurality of second liquid crystal films 12*a*, 12*b*, and 12*c* can improve the brightness on the negative polar angle θ side compared with Example 1-4 having an equivalent planar phase difference. When Example 2-2 is applied to an in-vehicle display device, for example, it can suppress reflection on the window glass on the passenger side (positive polar angle θ side, e.g., polar angle θ=−50°) and improve the brightness on the driver side (negative polar angle θ side, e.g., polar angle θ=+50°) compared with Example 1-4.

While the front phase differences of the first liquid crystal films 11*a*, 11*b*, and 11*c* are equal to those of the second liquid crystal films 12*a*, 12*b*, and 12*c* in Examples 2-1 and 2-2 described above, the present embodiment is not limited thereto.

Figures 14, 15:
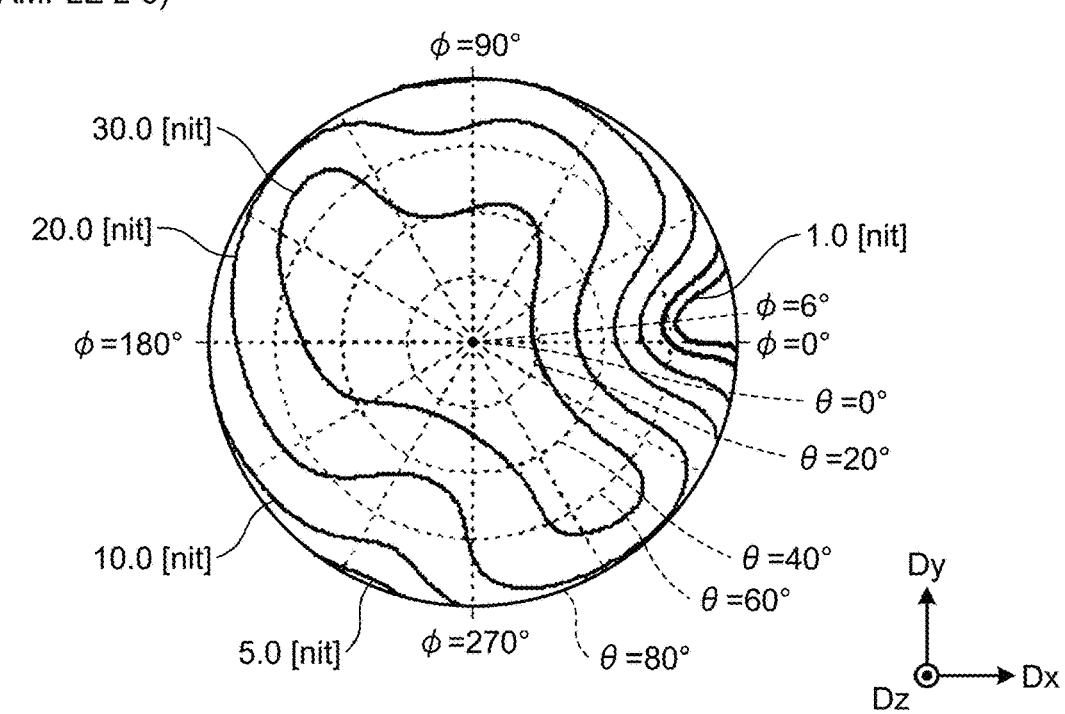
FIG. 14 is a table indicating the multilayered configuration and the planar phase difference of the liquid crystal films according to Example 2-3.
FIG. 15 is a diagram of the viewing angle dependence of the brightness of the display device according to Example 2-3.

FIG. 14 is a table indicating the multilayered configuration and the planar phase difference of the liquid crystal films according to Example 2-3. As illustrated in FIG. 14, the optical element according to Example 2-3 includes three layers of the first liquid crystal films 11*a*, 11*b*, and 11*c* and three layers of the second liquid crystal films 12*a*, 12*b*, and 12*c* and is composed of a total of six layers of the liquid crystal films. The front phase differences of the first liquid crystal films 11*a*, 11*b*, and 11*c* are different from those of the second liquid crystal films 12*a*, 12*b*, and 12*c*. Specifically, the front phase differences of the first liquid crystal films 11*a*, 11*b*, and 11*c* according to Example 2-3 are 140 nm, 140 nm, and 140 nm, respectively, and the front phase differences of the second liquid crystal films 12*a*, 12*b*, and 12*c* are 110 nm, 120 nm, and 120 nm, respectively.

FIG. 15 is a diagram of the viewing angle dependence of the brightness of the display device according to Example 2-3. As illustrated in FIG. 15, the display device according to Example 2-3 reduces the brightness on the right side (azimuth φ=0°) and improves the brightness on the left side (azimuth φ=180°) with respect to the reference line passing through a polar angle θ of 0° and parallel to the second direction Dy similarly to Example 2-2 described above (refer to FIGS. 9 and 12). While the display device according to Example 2-2 described above has the darkest region at an azimuth φ of 0°, the display device according to Example 2-3 has the darkest region at an azimuth φ of 6°.

As illustrated in Example 2-3, the brightness in a specific direction can be reduced within the range of front phase differences of the first liquid crystal films 11 and the second liquid crystal films 12 of 110 nm or larger. By making the front phase differences of the first liquid crystal films 11*a*, 11*b*, and 11*c* and the second liquid crystal films 12*a*, 12*b*, and 12*c* different from each other, the region where the brightness is reduced can be shifted to the positive azimuth φ side.

When the display device 100 having such polar angle dependence of the brightness is used for an in-vehicle display device, it can effectively suppress reflection on the window glass on the passenger side (or the driver side) if the window glass on the passenger side (or the driver side) is provided in an inclined manner.

Third Embodiment

Figure 16:
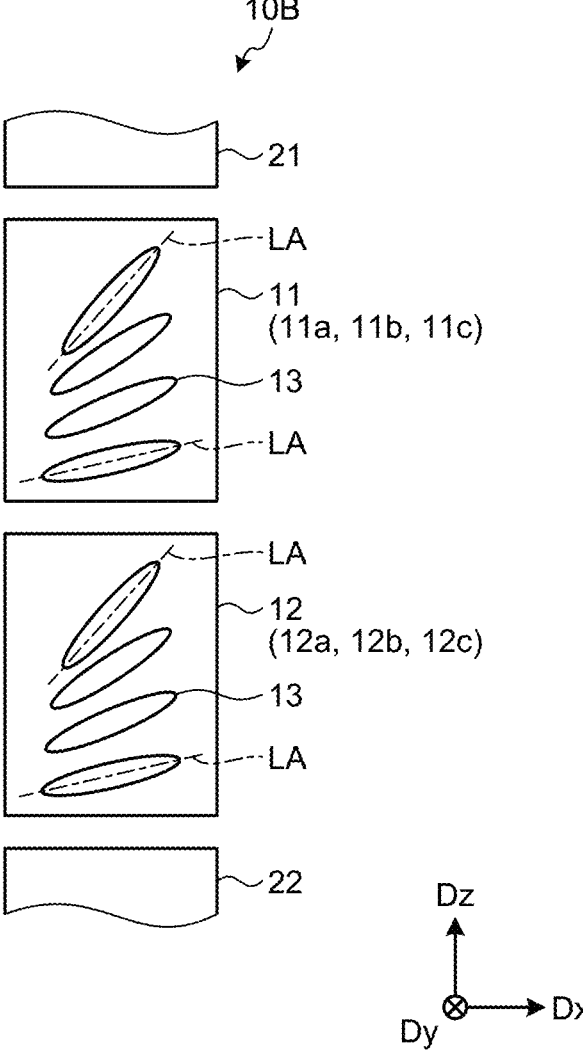
FIG. 16 is a view for explaining the orientation of the liquid crystal molecules in the first liquid crystal film and the second liquid crystal film of the optical element according to a third embodiment.

FIG. 16 is a view for explaining the orientation of the liquid crystal molecules in the first liquid crystal film and the second liquid crystal film of the optical element according to a third embodiment. To simplify the drawing, FIG. 16 illustrates the orientation of the liquid crystal molecules 13 of one layer of the first liquid crystal film 11 and one layer of the second liquid crystal film 12. The description of one layer of the first liquid crystal film 11 can be applied to each of the first liquid crystal films 11*a*, 11*b*, and 11*c*. The description of one layer of the second liquid crystal film 12 can be applied to each of the second liquid crystal films 12*a*, 12*b*, and 12*c*.

As illustrated in FIG. 16, in an optical element 10B according to the third embodiment, the first liquid crystal film 11 and the second liquid crystal film 12 are stacked such that the orientation (change in inclination angle) of the liquid crystal molecules 13 in the third direction Dz is equivalent in the layers compared with the embodiments and the examples described above.

More specifically, the liquid crystal molecules 13 of the first liquid crystal film 11 have a relatively small inclination angle on the side facing the second liquid crystal film 12 and are oriented to be substantially parallel to the direction parallel to the surface of the first liquid crystal film 11. By contrast, the liquid crystal molecules 13 of the first liquid crystal film 11 have a relatively large inclination angle on the side facing the first polarizing plate 21 and are oriented to be substantially perpendicular to the direction parallel to the surface of the first liquid crystal film 11. Thus, the inclination angle of the liquid crystal molecules 13 of the first liquid crystal film 11 with respect to a plane parallel to the surface of the first liquid crystal film 11 is larger on the side facing the first polarizing plate 21 than on the side facing the second liquid crystal film 12.

The liquid crystal molecules 13 of the second liquid crystal film 12 have a relatively small inclination angle on the side facing the second polarizing plate 22 and are oriented to be substantially parallel to the direction parallel to the surface of the second liquid crystal film 12. By contrast, the liquid crystal molecules 13 of the second liquid crystal film 12 have a relatively large inclination angle on the side facing the first liquid crystal film 11 and are oriented to be substantially perpendicular to the direction parallel to the surface of the second liquid crystal film 12. The inclination angle of the liquid crystal molecules 13 of the second liquid crystal film 12 with respect to a plane parallel to the surface of the second liquid crystal film 12 is smaller on the side facing the second polarizing plate 22 than on the side facing the first liquid crystal film 11.

Example 3

Figure 17:
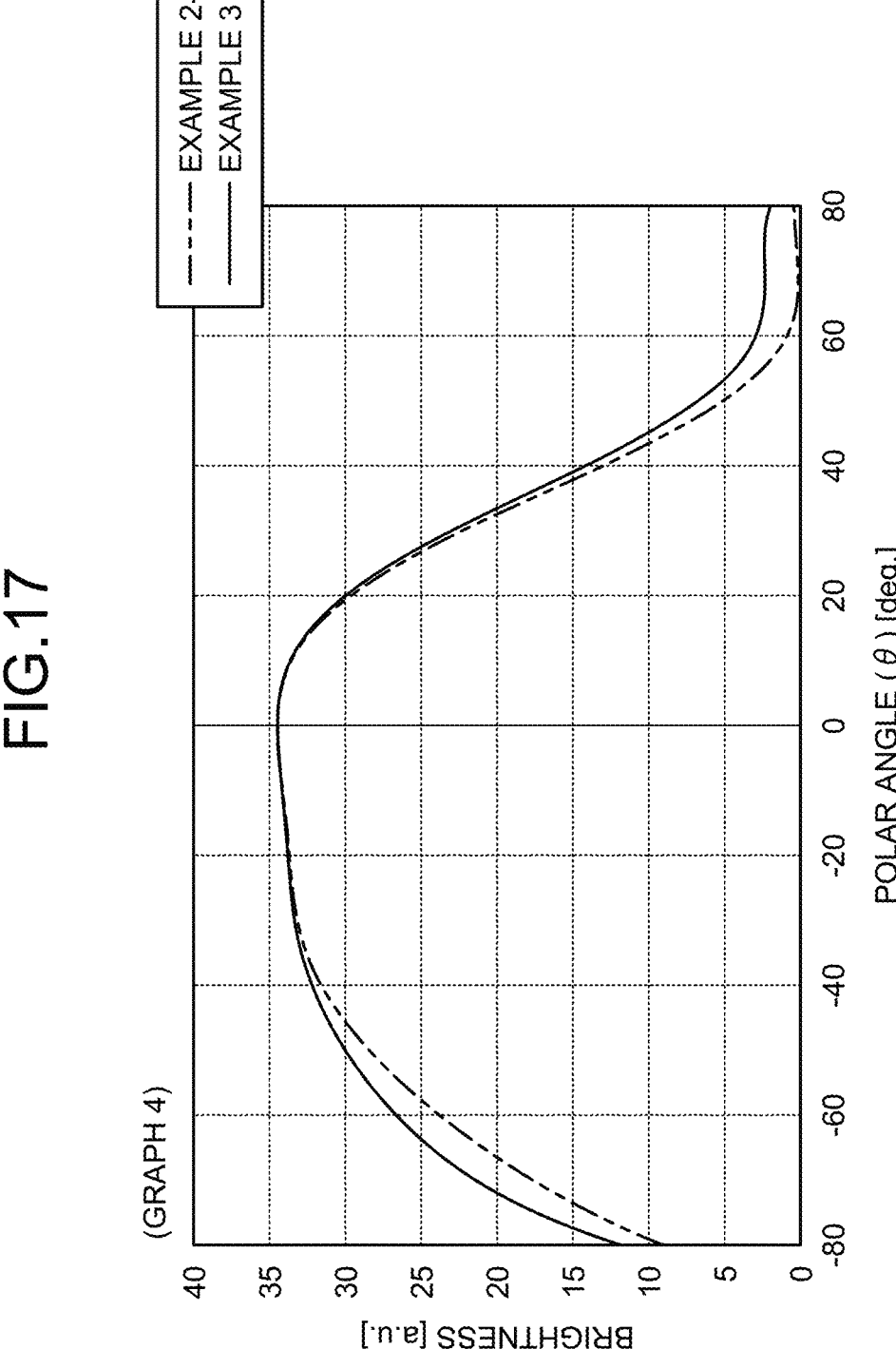
FIG. 17 is a graph indicating the relation between brightness and polar angle of the optical element according to Example 3 and Example 2-2.

FIG. 17 is a graph indicating the relation between brightness and polar angle of the optical element according to Example 3 and Example 2-2. In the optical element 10B according to Example 3, the change in tilt angle of the liquid crystal molecules 13 of the first liquid crystal films 11a, 11b, and 11c and the second liquid crystal films 12a, 12b, and 12c is equivalent in the layers as described above. In the optical element 10A according to Example 2-2, the tilt angles of the liquid crystal molecules 13 of the second liquid crystal films 12a, 12b, and 12c are line-symmetric with those of the liquid crystal molecules 13 of the first liquid crystal films 11a, 11b, and 11c with respect to the direction parallel to the surface of the first liquid crystal film 11 serving as the reference axis (refer to FIG. 4).

As illustrated in FIG. 17, the display device 100 with the optical element 10B according to Example 3 exhibits the polar angle dependence of the brightness equivalent to that of the display device 100 with the optical element 10A according to Example 2-2. In Example 3, the brightness is reduced on the positive polar angle θ side (e.g., polar angle θ=50°) compared with the negative polar angle θ side (e.g., polar angle θ=–50°). Example 3 is slightly brighter than Example 2-2 at the high polar angle side (polar angles θ of –50° or smaller and 50° or larger).

As described above, it is found out that the third embodiment and Example 3 can reduce the brightness in a specific direction (e.g., polar angle θ=50°) if the orientation (change in tilt angle) of the liquid crystal molecules 13 of the first liquid crystal film 11 and the second liquid crystal film 12 is different.

While the optical element 10B according to the third embodiment and Example 3 includes the first liquid crystal films 11a, 11b, and 11c and the second liquid crystal films 12a, 12b, and 12c, the present embodiment is not limited thereto. The third embodiment and Example 3 can be combined with a configuration including one layer of the first liquid crystal film 11 and one layer of the second liquid crystal film 12, that is, the first embodiment described above.

Fourth Embodiment

In the embodiments and the examples described above, the first absorption axis AX1 of the first polarizing plate 21 is parallel to the second absorption axis AX2 of the second polarizing plate 22, and the first orientation direction HX1 of the first liquid crystal film 11 is orthogonal to the second orientation direction HX2 of the second liquid crystal film 12. The present embodiment is not limited thereto.

Figures 18, 19:
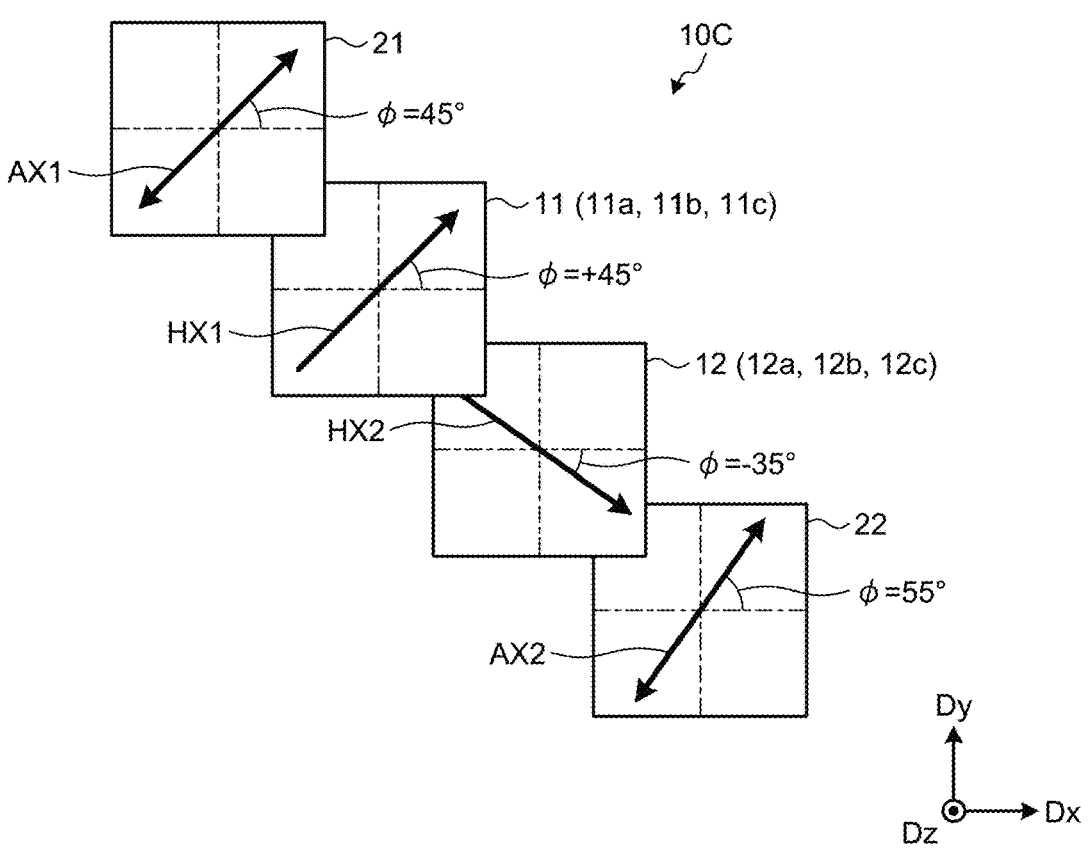
FIG. 18 is a view for explaining the relation between the azimuth of the absorption axis of each polarizing plate and the azimuth of the orientation of each liquid crystal film in the optical element according to a fourth embodiment.
FIG. 19 is a table indicating the azimuths of the absorption axis of each polarizing plate and the orientation of each liquid crystal film in the optical element according to Example 4 and Example 2-2.

FIG. 18 is a view for explaining the relation between the azimuth of the absorption axis of each polarizing plate and the azimuth of the orientation of each liquid crystal film in the optical element according to a fourth embodiment. To simplify the drawing, FIG. 18 illustrates the orientation direction of one layer of the first liquid crystal film 11 and one layer of the second liquid crystal film 12. The description of one layer of the first liquid crystal film 11 can be applied to each of the first liquid crystal films 11a, 11b, and 11c. The description of one layer of the second liquid crystal film 12 can be applied to each of the second liquid crystal films 12a, 12b, and 12c.

As illustrated in FIG. 18, in an optical element 10C according to the fourth embodiment, the first absorption axis AX1 of the first polarizing plate 21 extends in the direction of an azimuth φ of 45°. The second absorption axis AX2 of the second polarizing plate 22 extends in the direction of an azimuth φ of 55°. In other words, the first absorption axis AX1 of the first polarizing plate 21 is not parallel to the second absorption axis AX2 of the second polarizing plate 22 in plan view.

The azimuth φ of the first orientation direction HX1 of the first liquid crystal film 11 satisfies φ=+45°. The orientation angle φ of the second orientation direction HX2 of the second liquid crystal film 12 satisfies φ=–°. In other words, the first orientation direction HX1 of the first liquid crystal film 11 is parallel to the first absorption axis AX1 of the first polarizing plate 21 in plan view. The angle between the first orientation direction HX1 of the first liquid crystal film 11 and the second orientation direction HX2 of the second liquid crystal film 12 is smaller than 90° in plan view.

The first orientation direction HX1 of the first liquid crystal film 11 is not parallel to the second absorption axis AX2 of the second polarizing plate 22 in plan view. The second orientation direction HX2 of the second liquid crystal film 12 intersects the first absorption axis AX1 of the first polarizing plate 21 without being orthogonal thereto in plan view. The second orientation direction HX2 of the second liquid crystal film 12 is orthogonal to the second absorption axis AX2 of the second polarizing plate 22.

In other words, the optical element 10C according to the fourth embodiment has the orientation relation obtained by rotating the second liquid crystal film 12 and the second polarizing plate 22 of the optical element 10A according to the first embodiment (refer to FIG. 7) by an orientation angle φ of +10° as a single (one set of) optical functional layer.

Example 4

FIG. 19 is a table indicating the azimuths of the absorption axis of each polarizing plate and the orientation of each liquid crystal film in the optical element according to Example 4 and Example 2-2. As illustrated in FIG. 9, the azimuths φ of the first absorption axis AX1 of the first polarizing plate 21, the first orientation direction HX1 of the first liquid crystal film 11, the second orientation direction HX2 of the second liquid crystal film 12, and the second absorption axis AX2 of the second polarizing plate 22 of the optical element according to Example 4 are 45°, +45°, –35°, and 55°, respectively.

The azimuths φ of the first absorption axis AX1 of the first polarizing plate 21, the first orientation direction HX1 of the first liquid crystal film 11, the second orientation direction HX2 of the second liquid crystal film 12, and the second absorption axis AX2 of the second polarizing plate 22 of the optical element 10A according to Example 2-2 are 45°, +45°, –45°, and 45°, respectively.

Figure 20:
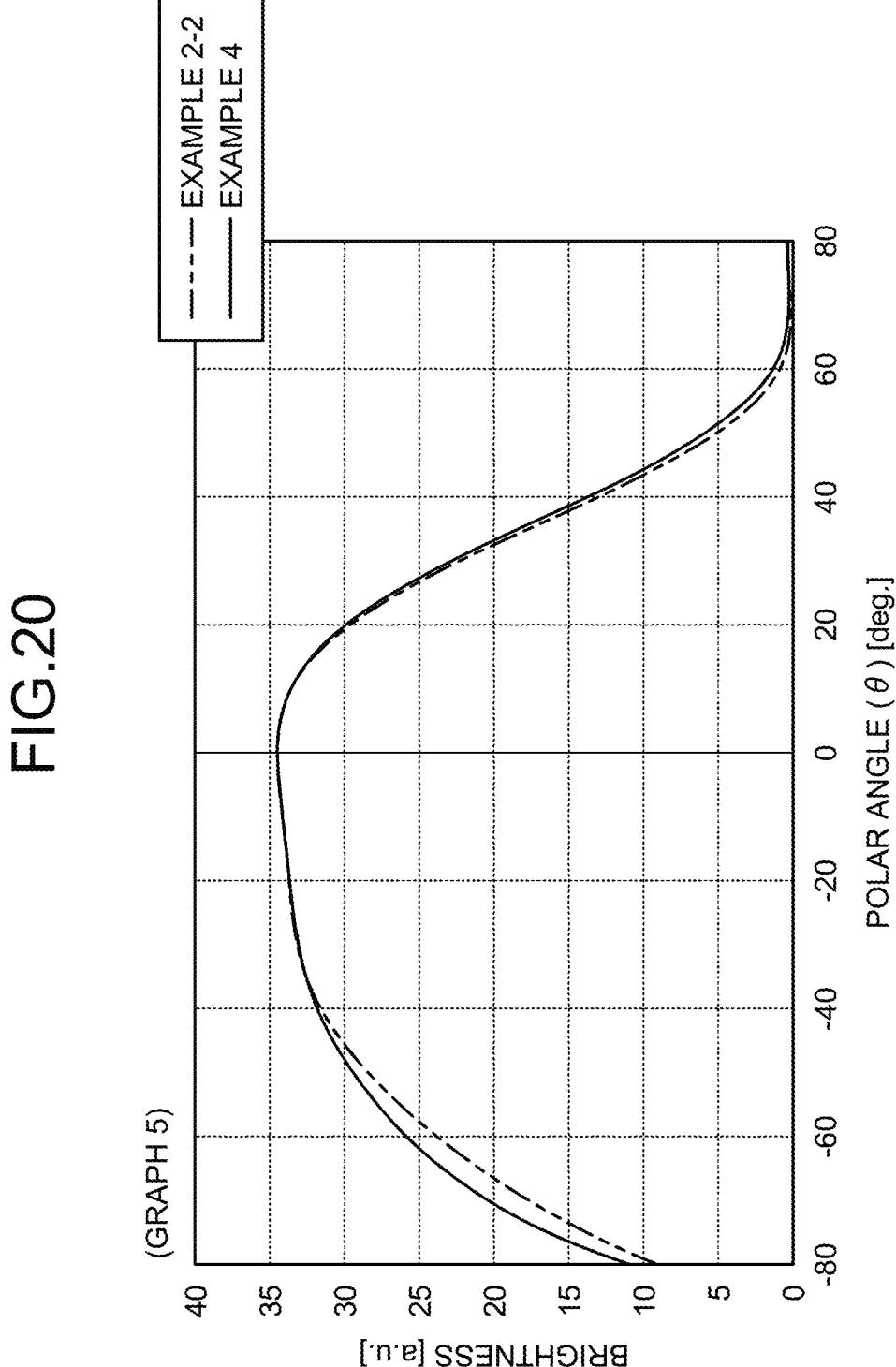
FIG. 20 is a graph indicating the relation between brightness and polar angle of the optical element according to Example 4 and Example 2-2.

FIG. 20 is a graph indicating the relation between brightness and polar angle of the optical element according to Example 4 and Example 2-2. As illustrated in FIG. 20, the display device 100 with the optical element 10C according to Example 4 exhibits the polar angle dependence of the brightness substantially equivalent to that of the display device 100 with the optical element 10A according to Example 2-2. In other words, in Example 4, the brightness is reduced on the positive polar angle θ side (e.g., polar angle θ=50°) compared with the negative polar angle θ side (e.g., polar angle θ=–50°). Example 4 is slightly brighter than Example 2-2 at the high polar angle side (polar angles θ of –50° or smaller).

Figure 21:
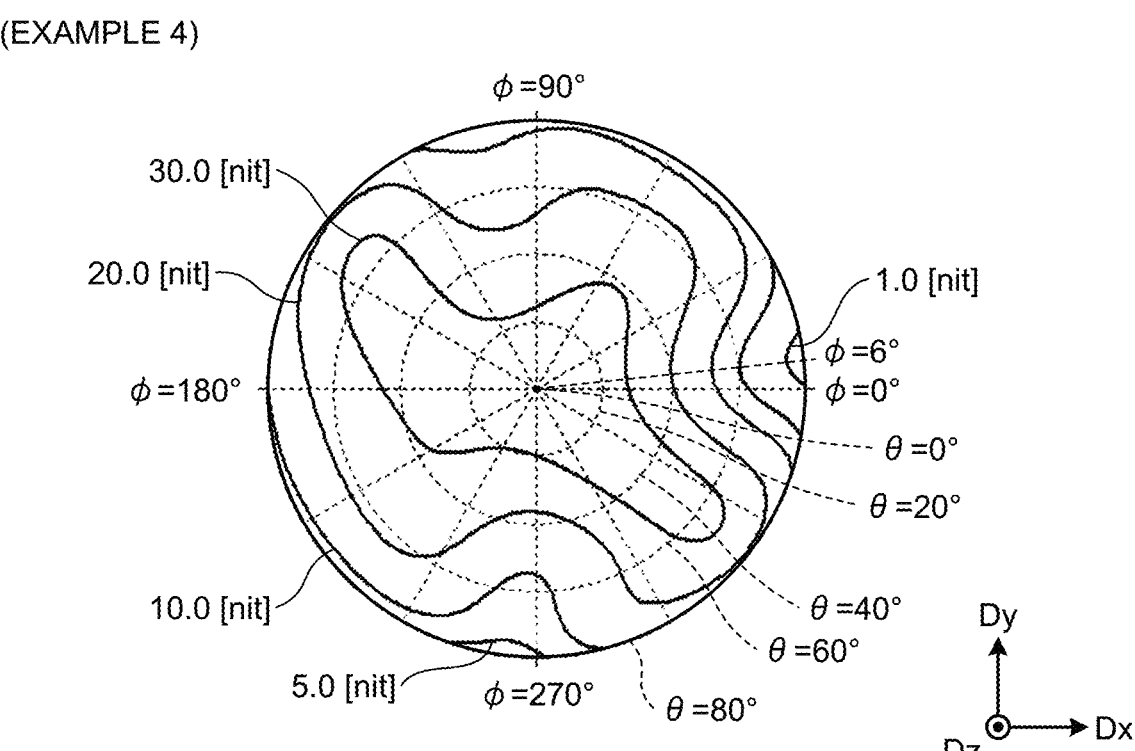
FIG. 21 is a diagram of the viewing angle dependence of the brightness of the display device according to Example 4.

FIG. 21 is a diagram of the viewing angle dependence of the brightness of the display device according to Example 4. As illustrated in FIG. 21, the display device according to Example 4 reduces the brightness on the right side (azimuth φ=0°) and improves the brightness on the left side (azimuth φ=180°) with respect to the reference line passing through a polar angle θ of 0° and parallel to the second direction Dy similarly to Example 2-2 described above (FIG. 12). The display device according to Example 4 has the darkest region at an azimuth φ of 6°.

Thus, the azimuth φ at which the brightness is reduced can be adjusted by adjusting the orientation relation in plan view between the first polarizing plate 21, the first liquid crystal films 11 (11a, 11b, and 11c), the second polarizing plate 22, and the second liquid crystal films 12 (12a, 12b, and 12c).

The azimuths φ of the respective layers illustrated in FIGS. 18 and 19 are given by way of example only and can be appropriately changed. While the configuration according to the fourth embodiment and Example 4 includes three layers of the first liquid crystal film 11 (11a, 11b, and 11c) and three layers of the second liquid crystal film 12 (12a, 12b, and 12c), the present embodiment is not limited thereto. The configuration according to the fourth embodiment can be combined with the examples of the first embodiment and the second embodiment, and the third embodiment described above.

Fifth Embodiment

Figure 22:
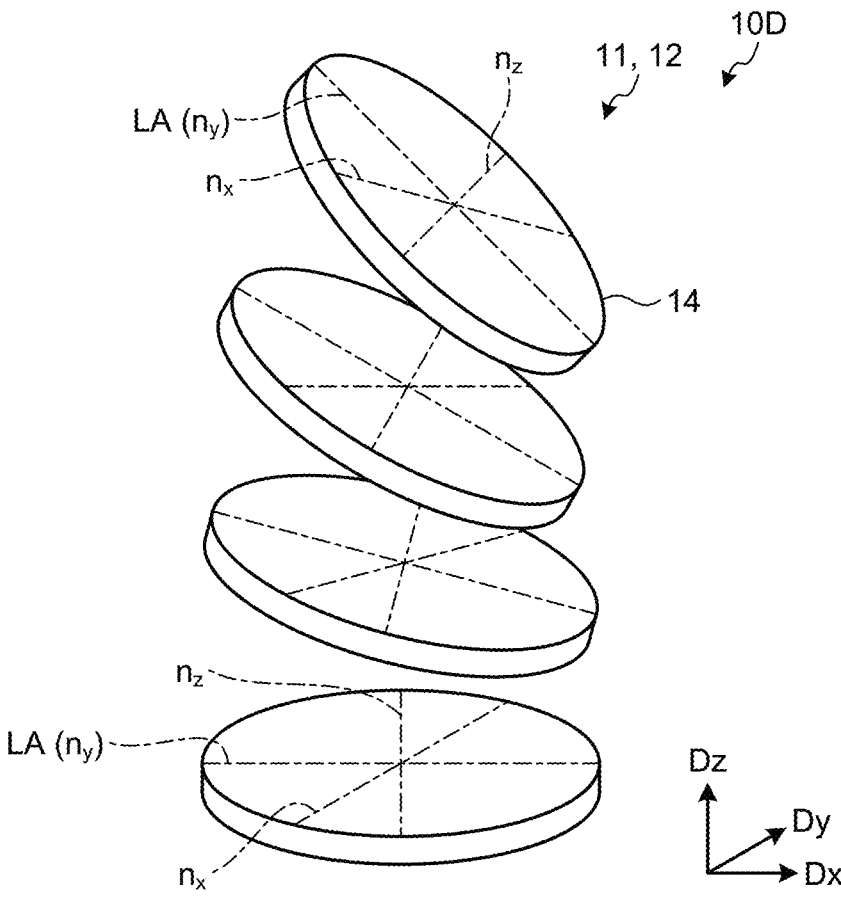
FIG. 22 is a view for explaining the orientation of the liquid crystal molecules in the liquid crystal films of the optical element according to a fifth embodiment.

FIG. 22 is a view for explaining the orientation of the liquid crystal molecules in the liquid crystal films of the optical element according to a fifth embodiment. As illustrated in FIG. 22, the first liquid crystal film 11 and the second liquid crystal film 12 in an optical element according to the fifth embodiment each include disc-shaped liquid crystal molecules 14 (discotic liquid crystal molecules). In the first liquid crystal film 11 and the second liquid crystal film 12, the disc-shaped liquid crystal molecules 14 are immobilized in hybrid orientation along the third direction Dz.

The liquid crystal molecule 14 has refractive index anisotropy, and a refractive index ny (=ne) of the liquid crystal molecule 13 in a direction along a long axis LA is different from refractive indexes nx and nz (nx=nz (=no)) in a direction orthogonal to the long axis LA. The refractive index nx according to the present embodiment is the refractive index in the in-plane direction of the liquid crystal molecule 13, and the refractive index nz is the refractive index in the normal direction of the liquid crystal molecule 13.

If the first liquid crystal film 11 and the second liquid crystal film 12 with the disc-shaped liquid crystal molecules 14 are used, the fifth embodiment can suppress transmission of light in a specific direction similarly to the embodiments described above. The configuration according to the fifth embodiment can be combined with the embodiments and the examples described above.

Modifications

Figure 23:
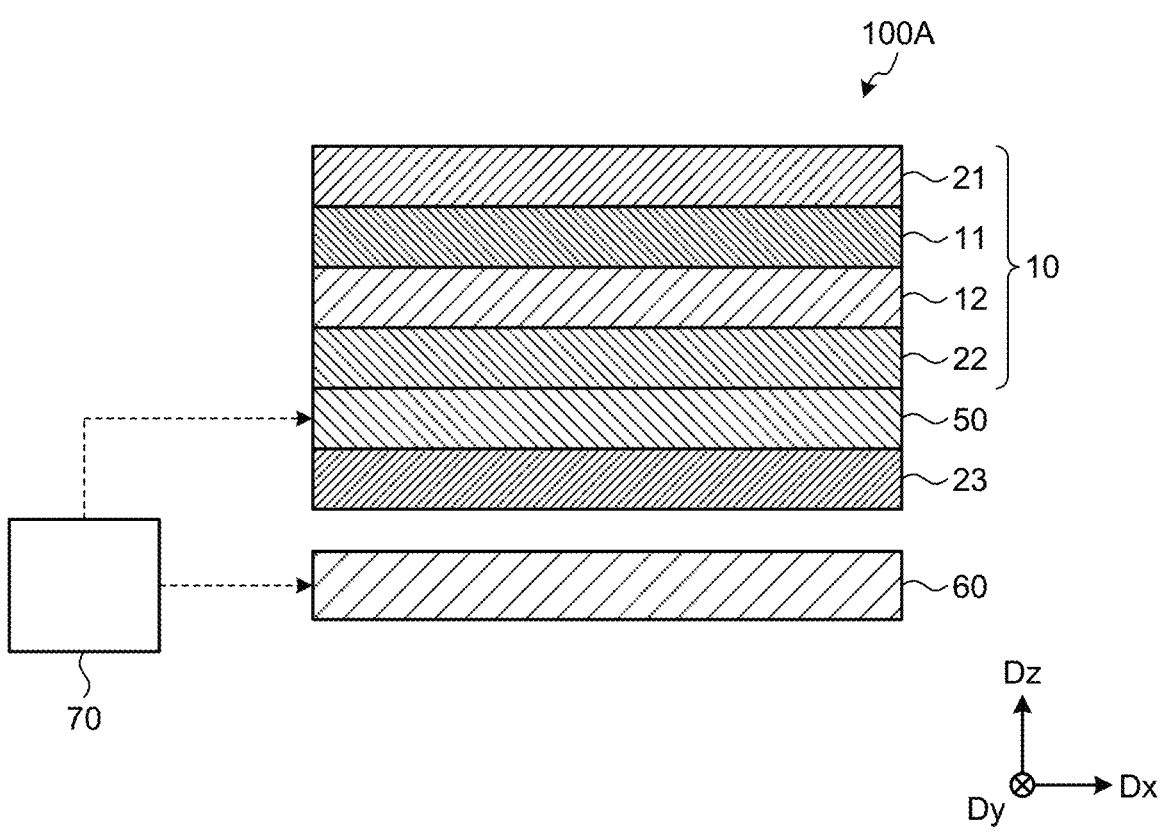
FIG. 23 is a sectional view schematically illustrating the display device according to a first modification.

The multilayered structure of the optical element 10 and the display panel 50 and the type of the display panel are not limited to the configuration described above with reference to FIG. 1. FIG. 23 is a sectional view schematically illustrating the display device according to a first modification. As illustrated in FIG. 23, the optical element 10 in a display device 100A according to the first modification is disposed on the display surface side of the display panel 50. In other words, the lighting device 60, the third polarizing plate 23, the display panel and the optical element 10 are stacked in order in the third direction Dz.

In the display device 100A according to the first modification, display light output from the display panel 50 is incident on the optical element 10. The optical element 10 adjusts the viewing angle dependence of light incident from the display panel 50 to suppress transmission of light in a specific direction. As a result, the display device 100A displays an image the brightness of which is reduced in the specific direction.

The second polarizing plate 22 of the optical element according to the first modification also serves as a polarizing plate on the display surface side of the display panel 50. In other words, one second polarizing plate 22 is disposed between the display panel 50 and the second liquid crystal film 12 of the optical element 10. This configuration can improve the light transmittance compared with a configuration in which another polarizing plate different from the second polarizing plate 22 is provided on the display surface side of the display panel 50.

Figure 24:
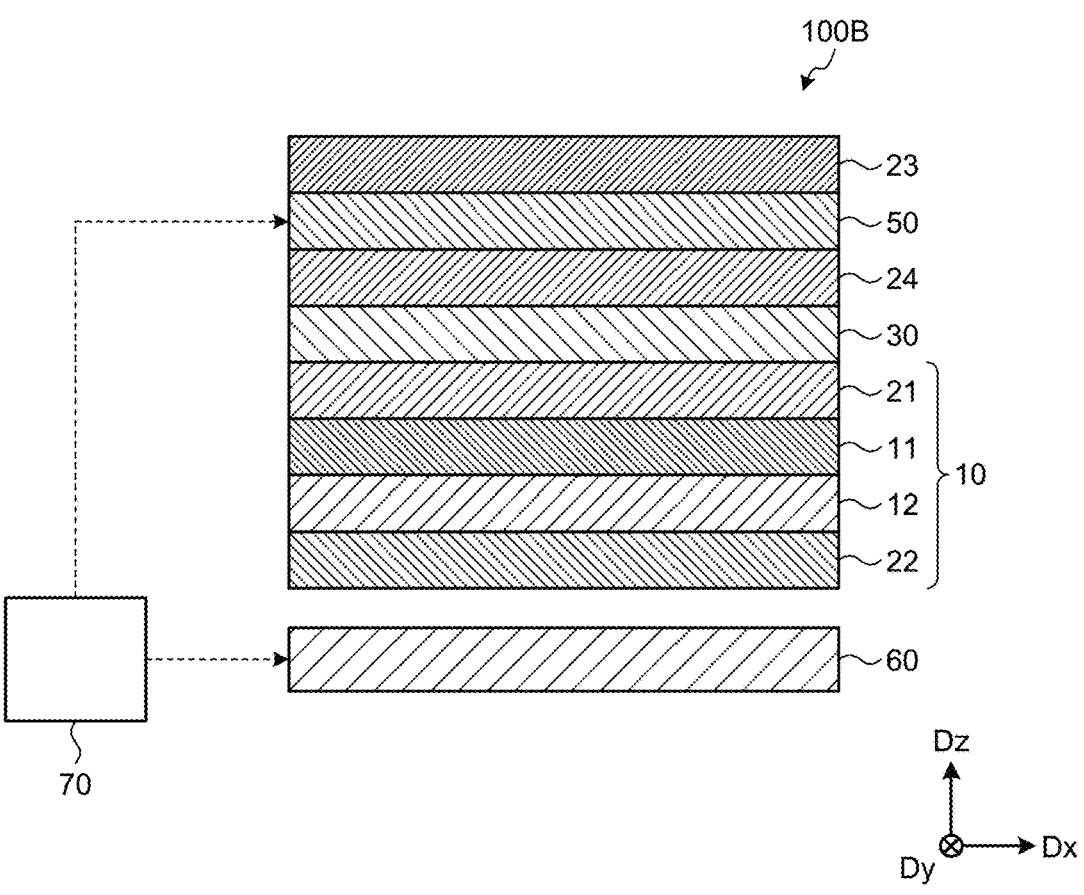
FIG. 24 is a sectional view schematically illustrating the display device according to a second modification.

FIG. 24 is a sectional view schematically illustrating the display device according to a second modification. As illustrated in FIG. 24, the optical element 10 in a display device 100B according to the second modification is disposed between the lighting device 60 and the display panel 50 in the third direction Dz. A fourth polarizing plate 24 and a polarization rotating element 30 are provided on the back side (side facing the optical element of the display panel 50. In other words, the polarization rotating element 30 is provided between the fourth polarizing plate 24 of the display panel 50 and the first polarizing plate 21 of the optical element 10 in the third direction Dz.

The polarization rotating element 30 is a birefringent film having a phase difference of λ/2, for example. If the absorption axis of the fourth polarizing plate 24 of the display panel 50 is not parallel to the absorption axis of the first polarizing plate 21 of the optical element 10, the polarization rotating element 30 can suppress reduction in light use efficiency. The polarization rotating element has a slow axis in the middle between the absorption axis of the fourth polarizing plate 24 of the display panel and the absorption axis of the first polarizing plate 21 of the optical element 10 in plan view.

Figure 25:
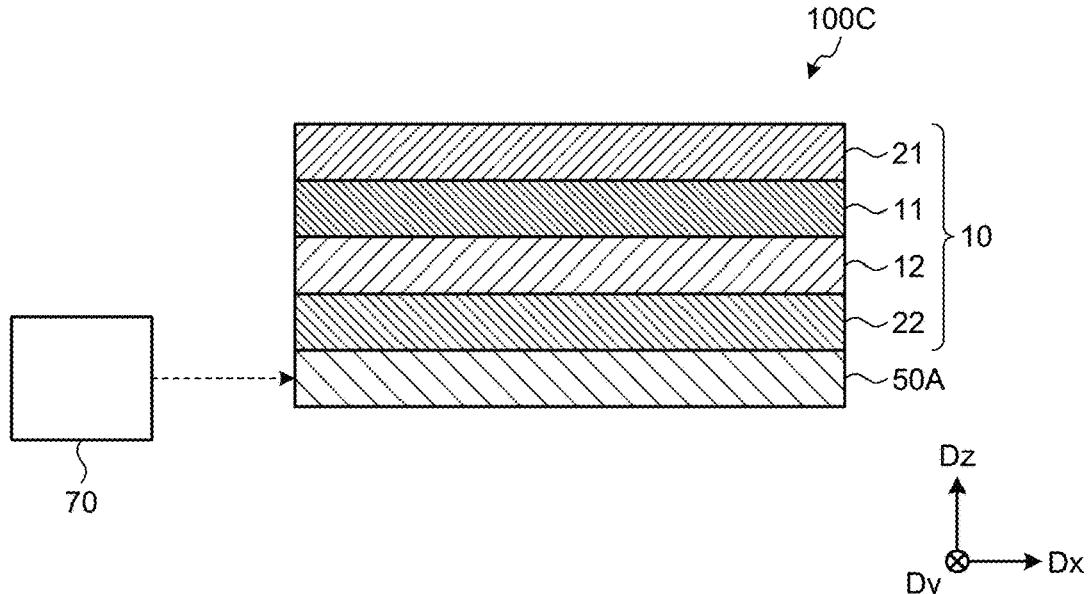
FIG. 25 is a sectional view schematically illustrating the display device according to a third modification.

FIG. 25 is a sectional view schematically illustrating the display device according to a third modification. As illustrated in FIG. 25, a display panel 50A in a display device 100C according to the third modification is an organic light-emitting diode (OLED) display panel. The display panel 50A is a self-emitting display panel, and the display device 100C does not include the lighting device 60. The optical element 10 according to the third modification is disposed on the display surface side of the display panel 50A.

While the display panel in the examples described above is the liquid crystal display panel and the OLED display panel, the present invention is not limited thereto. The display panel may be an inorganic EL display panel (micro-LED or mini-LED) or an electrophoretic display panel (electrophoretic display (EPD)).

While exemplary embodiments according to the present disclosure have been described, the embodiments are not intended to limit the disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure. At least one of various omissions, substitutions, and modifications of the components may be made without departing from the gist of the embodiments above and the modifications thereof.

What is claimed is:

1. An optical element comprising:

a first polarizing plate having a first absorption axis;

a second polarizing plate facing the first polarizing plate and having a second absorption axis; and a first liquid crystal film and a second liquid crystal film provided between the first polarizing plate and the second polarizing plate, wherein the second polarizing plate, the second liquid crystal film, the first liquid crystal film, and the first polarizing plate are stacked in order, the first liquid crystal film and the second liquid crystal film each include a liquid crystal molecule immobilized in hybrid orientation along a normal direction, a front phase difference of the first liquid crystal film and the second liquid crystal film is 200 nm or larger, an inclination angle of the liquid crystal molecule of the first liquid crystal film with respect to a plane parallel to a surface of the first liquid crystal film is formed smaller on a side facing the first polarizing plate than on a side facing the second liquid crystal film, an inclination angle of the liquid crystal molecule of the second liquid crystal film with respect to a plane parallel to a surface of the second liquid crystal film is formed smaller on a side facing the second polarizing plate than on a side facing the first liquid crystal film, a first orientation direction that is a direction along a long axis of the liquid crystal molecule of the first liquid crystal film is orthogonal or parallel to the first absorption axis of the first polarizing plate in plan view, the first absorption axis of the first polarizing plate is parallel to the second absorption axis of the second polarizing plate in the plan view, the first orientation direction of the first liquid crystal film is orthogonal to a second orientation direction that is a direction along the long axis of the liquid crystal molecule of the second liquid crystal film in the plan view, and the second orientation direction of the second liquid crystal film is orthogonal or parallel to the second absorption axis of the second polarizing plate.

2. An optical element comprising:

a first polarizing plate having a first absorption axis;

a second polarizing plate facing the first polarizing plate and having a second absorption axis; and a plurality of first liquid crystal films and a plurality of second liquid crystal films provided between the first polarizing plate and the second polarizing plate, wherein the second polarizing plate, the second liquid crystal films, the first liquid crystal films, and the first polarizing plate are stacked in order, the first liquid crystal films and the second liquid crystal films each include a liquid crystal molecule immobilized in hybrid orientation along a normal direction, and a front phase difference of the first liquid crystal films and the second liquid crystal films is 110 nm or larger, an inclination angle of the liquid crystal molecule of the first liquid crystal film with respect to a plane parallel to a surface of the first liquid crystal film is formed smaller on a side facing the first polarizing plate than on a side facing the second liquid crystal film, an inclination angle of the liquid crystal molecule of the second liquid crystal film with respect to a plane parallel to a surface of the second liquid crystal film is formed smaller on a side facing the second polarizing plate than on a side facing the first liquid crystal film, a first orientation direction that is a direction along a long axis of the liquid crystal molecule of the first liquid crystal film is orthogonal or parallel to the first absorption axis of the first polarizing plate in plan view, the first absorption axis of the first polarizing plate is parallel to the second absorption axis of the second polarizing plate in the plan view, the first orientation direction of the first liquid crystal film is orthogonal to a second orientation direction that is a direction along the long axis of the liquid crystal molecule of the second liquid crystal film in the plan view, and the second orientation direction of the second liquid crystal film is orthogonal or parallel to the second absorption axis of the second polarizing plate.

3. An optical element comprising:

a first polarizing plate having a first absorption axis;

a second polarizing plate facing the first polarizing plate and having a second absorption axis; and a first liquid crystal film and a second liquid crystal film provided between the first polarizing plate and the second polarizing plate, wherein the second polarizing plate, the second liquid crystal film, the first liquid crystal film, and the first polarizing plate are stacked in order, the first liquid crystal film and the second liquid crystal film each include a liquid crystal molecule immobilized in hybrid orientation along a normal direction, a front phase difference of the first liquid crystal film and the second liquid crystal film is 200 nm or larger, an inclination angle of the liquid crystal molecule of the first liquid crystal film with respect to a plane parallel to a surface of the first liquid crystal film is formed larger on a side facing the first polarizing plate than on a side facing the second liquid crystal film, an inclination angle of the liquid crystal molecule of the second liquid crystal film with respect to a plane parallel to a surface of the second liquid crystal film is formed smaller on a side facing the second polarizing plate than on a side facing the first liquid crystal film, a first orientation direction that is a direction along a long axis of the liquid crystal molecule of the first liquid crystal film is orthogonal or parallel to the first absorption axis of the first polarizing plate in plan view, the first absorption axis of the first polarizing plate is parallel to the second absorption axis of the second polarizing plate in the plan view, the first orientation direction of the first liquid crystal film is orthogonal to a second orientation direction that is a direction along the long axis of the liquid crystal molecule of the second liquid crystal film in the plan view, and the second orientation direction of the second liquid crystal film is orthogonal or parallel to the second absorption axis of the second polarizing plate.

4. An optical element comprising:

a first polarizing plate having a first absorption axis;

a second polarizing plate facing the first polarizing plate and having a second absorption axis; and a plurality of first liquid crystal films and a plurality of second liquid crystal films provided between the first polarizing plate and the second polarizing plate, wherein the second polarizing plate, the second liquid crystal films, the first liquid crystal films, and the first polarizing plate are stacked in order, the first liquid crystal films and the second liquid crystal films each include a liquid crystal molecule immobilized in hybrid orientation along a normal direction, a front phase difference of the first liquid crystal films and the second liquid crystal films is 110 nm or larger, an inclination angle of the liquid crystal molecule of the first liquid crystal film with respect to a plane parallel to a surface of the first liquid crystal film is formed larger on a side facing the first polarizing plate than on a side facing the second liquid crystal film, an inclination angle of the liquid crystal molecule of the second liquid crystal film with respect to a plane parallel to a surface of the second liquid crystal film is formed smaller on a side facing the second polarizing plate than on a side facing the first liquid crystal film, a first orientation direction that is a direction along a long axis of the liquid crystal molecule of the first liquid crystal film is orthogonal or parallel to the first absorption axis of the first polarizing plate in plan view, the first absorption axis of the first polarizing plate is parallel to the second absorption axis of the second polarizing plate in the plan view, the first orientation direction of the first liquid crystal film is orthogonal to a second orientation direction that is a direction along the long axis of the liquid crystal molecule of the second liquid crystal film in the plan view, and the second orientation direction of the second liquid crystal film is orthogonal or parallel to the second absorption axis of the second polarizing plate.

5. The optical element according to claim 2, wherein
the first orientation directions are parallel in a plan view, and
the second orientation directions are parallel in the plan view.

6. The optical element according to claim 1, wherein the front phase difference of the first liquid crystal film is different from the front phase difference of the second liquid crystal film.

7. A display device comprising:
the optical element according to claim 1; and
a display panel layered with the optical element.

8. The display device according to claim 7, wherein one of the first polarizing plate and the second polarizing plate also serves as a polarizing plate of the display panel.

9. The display device according to claim 7 comprising a polarization rotating element provided between the display panel and the optical element.

10. The optical element according to claim 4, wherein
the first orientation directions are parallel in a plan view, and
the second orientation directions are parallel in the plan view.

11. The optical element according to claim 3, wherein the front phase difference of the first liquid crystal film is different from the front phase difference of the second liquid crystal film.

12. A display device comprising:
the optical element according to claim 3; and
a display panel layered with the optical element.

13. The display device according to claim 12, wherein one of the first polarizing plate and the second polarizing plate also serves as a polarizing plate of the display panel.

14. The display device according to claim 12, comprising a polarization rotating element provided between the display panel and the optical element.

* * * * *